(12) United States Patent
Kadokawa

(10) Patent No.: US 8,864,610 B2
(45) Date of Patent: Oct. 21, 2014

(54) BELT TYPE CONTINUOUSLY VARIABLE TRANSMISSION FOR VEHICLE

(75) Inventor: Masanori Kadokawa, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 126 days.

(21) Appl. No.: 13/582,154

(22) PCT Filed: May 25, 2010

(86) PCT No.: PCT/JP2010/058843
§ 371 (c)(1),
(2), (4) Date: Nov. 5, 2012

(87) PCT Pub. No.: WO2011/108127
PCT Pub. Date: Sep. 9, 2011

(65) Prior Publication Data
US 2013/0040769 A1 Feb. 14, 2013

(30) Foreign Application Priority Data
Mar. 4, 2010 (JP) ...................... PCTJP2010/053576

(51) Int. Cl.
| | |
|---|---|
| F16H 55/56 | (2006.01) |
| F16H 9/12 | (2006.01) |
| F16H 59/00 | (2006.01) |
| F16H 61/00 | (2006.01) |
| F16H 63/00 | (2006.01) |
| F16H 63/34 | (2006.01) |
| F16H 9/18 | (2006.01) |

(52) U.S. Cl.
CPC .............. *F16H 9/18* (2013.01); *F16H 63/3425* (2013.01)
USPC ................... 474/8; 474/24; 474/28

(58) Field of Classification Search
USPC ................................. 474/8, 24, 28
See application file for complete search history.

(56) References Cited

U.S. PATENT DOCUMENTS
5,032,108 A * 7/1991 Taniguchi et al. .............. 474/28
(Continued)

FOREIGN PATENT DOCUMENTS
JP 3-118347 12/1991
(Continued)

OTHER PUBLICATIONS
International Search Report in International Application No. PCT/JP2010/058843; Mailing Date: Jun. 22, 2010.

*Primary Examiner* — Henry Liu
(74) *Attorney, Agent, or Firm* — Finnegan, Henderson, Farabow, Garrett & Dunner, LLP

(57) ABSTRACT

A belt type continuously variable transmission for a vehicle includes: an input shaft and an output shaft disposed in parallel with each other; a pair of groove width variable pulleys disposed on the outer circumferential sides of the input shaft and the output shaft; and a transmission belt wound around each of V-grooves of the pair of the groove width variable pulleys, the belt type continuously variable transmission for a vehicle changing a winding diameter of the transmission belt by changing the groove widths of the V-grooves so as to continuously vary a gear ratio, wherein the groove width variable pulley includes a fixed sheave fixed to an outer circumferential surface of one of the input shaft and the output shaft, and a movable sheave disposed relatively non-rotatably on the one shaft and relatively movably in the direction of the shaft center of the one shaft so as to form the V-groove with the fixed sheave, wherein the belt type continuously variable transmission for a vehicle is disposed with a parking gear having a disc-shaped main body portion fixed to the one shaft on the side opposite to the movable sheave relative to the fixed sheave, and an annular projecting portion projecting from the main body portion toward a wall surface of the fixed sheave on the side opposite to the movable sheave and abutting on the wall surface of the opposite side on the outer circumferential side than the minimum winding diameter of the transmission belt, and wherein the annular projecting portion of the parking gear abuts on the wall surface of the fixed sheave on the side opposite to the movable sheave at a radial position corresponding to the maximum winding diameter of the transmission belt.

10 Claims, 10 Drawing Sheets

(56) References Cited

U.S. PATENT DOCUMENTS

| | | | |
|---|---|---|---|
| 6,234,925 B1* | 5/2001 | Walter | 474/18 |
| 6,561,934 B2* | 5/2003 | Kashiwase | 474/28 |
| 6,565,465 B2* | 5/2003 | Nishigaya et al. | 474/28 |
| 6,585,613 B1* | 7/2003 | Walter et al. | 474/8 |
| 7,686,715 B2* | 3/2010 | Carlson et al. | 474/28 |
| 7,771,299 B2* | 8/2010 | Mochizuki et al. | 474/12 |
| 8,460,138 B2* | 6/2013 | Unno | 474/29 |
| 2001/0016528 A1* | 8/2001 | Kashiwase | 474/28 |
| 2001/0031678 A1* | 10/2001 | Schmid et al. | 474/18 |
| 2001/0044349 A1* | 11/2001 | Tanigawa et al. | 474/8 |
| 2002/0065156 A1* | 5/2002 | Younggren et al. | 474/19 |
| 2002/0155909 A1* | 10/2002 | Roby | 474/14 |
| 2004/0171443 A1* | 9/2004 | Borghi | 474/12 |
| 2004/0248679 A1* | 12/2004 | Hsu et al. | 474/15 |
| 2005/0233847 A1* | 10/2005 | Kuroda | 474/50 |
| 2006/0019781 A1* | 1/2006 | Roby | 474/8 |
| 2006/0052192 A1* | 3/2006 | Walter | 474/28 |
| 2006/0058128 A1* | 3/2006 | Glas | 474/8 |
| 2007/0054765 A1* | 3/2007 | Mochizuki et al. | 474/18 |
| 2007/0117664 A1* | 5/2007 | Shioiri et al. | 474/28 |
| 2007/0249440 A1* | 10/2007 | Nozawa et al. | 474/28 |
| 2013/0059684 A1* | 3/2013 | Kadokawa | 474/8 |

FOREIGN PATENT DOCUMENTS

| | | |
|---|---|---|
| JP | 2000-170859 | 6/2000 |
| JP | 2001-323978 | 11/2001 |
| JP | 2002-106658 | 4/2002 |
| JP | 2004-84874 | 3/2004 |
| JP | 2005-3035 | 1/2005 |
| JP | 2005-291319 | 10/2005 |
| JP | 2006-105217 | 4/2006 |
| JP | 2008-232389 | 10/2006 |
| JP | 2007-170504 | 7/2007 |
| JP | 2008-309232 | 12/2008 |
| JP | 2009-150496 | 7/2009 |

* cited by examiner

BELT TYPE CONTINUOUSLY VARIABLE TRANSMISSION FOR VEHICLE

CROSS-REFERENCE TO RELATED APPLICATIONS

This application is a national phase application of International Application No. PCT/JP2010/058843, filed May 25, 2010, and claims the priority of International Application No. PCT/JP2010/053576, filed Mar. 4, 2010, the content of both of which is incorporated herein by reference.

TECHNICAL FIELD

The present invention relates to a belt type continuously variable transmission for a vehicle and particularly to a technique of suppressing the fall of a fixed sheave.

BACKGROUND ART

A belt type continuously variable transmission for a vehicle is known that includes an input shaft and an output shaft disposed in parallel with each other, a pair of groove width variable pulleys disposed on the outer circumferential sides of the input shaft and the output shaft, and a transmission belt wound around each of V-grooves of the pair of the groove width variable pulleys and that changes a winding diameter of the transmission belt by changing the groove widths of the V-grooves so as to continuously vary a gear ratio. For example, this corresponds to those described in Patent Documents 1 to 9.

PRIOR ART DOCUMENTS

Patent Documents

Patent Document 1: Japanese Laid-Open Patent Publication No. 2008-309232
Patent Document 2: Japanese Laid-Open Patent Publication No. 2002-106658
Patent Document 3: Japanese Laid-Open Patent Publication No. 2005-291319
Patent Document 4: Japanese Laid-Open Patent Publication No. 2007-170504
Patent Document 5: Japanese Laid-Open Patent Publication No. 2005-003035
Patent Document 6: Japanese Laid-Open Patent Publication No. 2004-084874
Patent Document 7: Japanese unexamined utility model application publication No. 3-118347
Patent Document 8: Japanese Laid-Open Patent Publication No. 2001-323978
Patent Document 9: Japanese Laid-Open Patent Publication No. 2009-150496

SUMMARY OF THE INVENTION

Problem to be Solved by the Invention

A groove width variable pulley of Patent Documents 1 to 3 and 8 includes a fixed sheave fixed to a rotation shaft and a movable sheave disposed on the rotation shaft movably in a shaft center direction and relatively non-rotatably around the shaft center to form a V-groove with the fixed sheave, and the transmission belt is clamped between the fixed sheave and the movable sheave. In this case, the fixed sheave is affected by the moment causing the fixed sheave to fall toward the side opposite to the transmission belt with a base portion, i.e., an inner circumferential portion of the fixed sheave used as a fulcrum due to a force in the shaft center direction out of a reaction force applied from the transmission belt. Therefore, a conventional belt type continuously variable transmission has a problem of lowering of transmission torque due to reduction in a contact area between the fixed sheave and the transmission belt because the fixed sheave is deformed in the direction of falling toward the side opposite to the movable sheave. Although the problem is addressed by, for example, increasing the thickness of the fixed sheave in the shaft center direction to improve the strength, this is disadvantageous because of increase in the manufacturing cost and weight of the continuously variable transmission.

In this regard, for example, Patent Document 4 describes an elastic member, for example, a plate spring biasing the fixed sheave toward the movable sheave from the side opposite to the movable sheave so as to resist the reaction force. Patent Document 9 describes a fixed sheave having a clamping pulley portion disposed on a rotation shaft such that a V-groove is formed with a movable sheave, and a support pulley portion disposed on the side opposite to the movable sheave relative to the clamping pulley portion and supporting the clamping pulley portion so as to resist a reaction force applied to the clamping pulley portion from the transmission belt. However, these are disadvantageous since the elastic member and a bearing supporting the member must newly be added or the fixed sheave must be formed in a divided manner, increasing the number of parts. Patent Documents 5 to 7 describe that an oil chamber is formed adjacently to a wall surface of a fixed sheave on the side opposite to a movable sheave to supply oil pressure to the oil chamber to resist the reaction force. However, these are disadvantageous since the configuration is complicated and parts must considerably be changed because the members are added for forming the oil chamber and an oil passage for supplying the oil pressure to the oil chamber.

The present invention was conceived in view of the situations and it is therefore an object of the present invention to provide a belt type continuously variable transmission for a vehicle capable of suppressing the fall of a fixed sheave without any additional parts.

Means for Solving the Problems

To achieve the object, the first aspect of the present invention provides a belt type continuously variable transmission for a vehicle (a) comprising: an input shaft and an output shaft disposed in parallel with each other; a pair of groove width variable pulleys disposed on the outer circumferential sides of the input shaft and the output shaft; and a transmission belt wound around each of V-grooves of the pair of the groove width variable pulleys, the belt type continuously variable transmission for a vehicle changing a winding diameter of the transmission belt by changing the groove widths of the V-grooves so as to continuously vary a gear ratio, wherein (b) the groove width variable pulley includes a fixed sheave fixed to an outer circumferential surface of one of the input shaft and the output shaft, and a movable sheave disposed relatively non-rotatably on the one shaft and relatively movably in the direction of the shaft center of the one shaft so as to form the V-groove with the fixed sheave, wherein (c) the belt type continuously variable transmission for a vehicle is disposed with a parking gear having a disc-shaped main body portion fixed to the one shaft on the side opposite to the movable sheave relative to the fixed sheave, and an annular projecting portion projecting from the main body portion toward a wall surface of the fixed sheave on the side opposite to the movable sheave and abutting on the wall surface of the opposite side on the outer circumferential side than the minimum winding diameter of the transmission belt, and wherein (d) the annular projecting portion of the parking gear abuts on the wall surface of the fixed sheave on the side opposite to the movable sheave at a radial position corresponding to the maximum winding diameter of the transmission belt.

The third aspect of the present invention provides the belt type continuously variable transmission for a vehicle recited in the first aspect of the present invention, wherein the annular projecting portion of the parking gear abuts on the wall surface, on the side opposite to the movable sheave, of the fixed sheave of the groove width variable pulley disposed on the output shaft.

The fourth aspect of the present invention provides the belt type continuously variable transmission for a vehicle recited in the first or third aspect of the present invention, wherein the annular projecting portion of the parking gear is fitted into and radially engaged with an annular fitting portion projected toward the parking gear from an outer circumferential portion of the wall surface of the fixed sheave on the side opposite to the movable sheave.

The fifth aspect of the present invention provides the belt type continuously variable transmission for a vehicle recited in any one of the first, third and fourth aspects of the present invention, wherein the annular projecting portion of the parking gear is circumferentially engaged with engagement teeth formed on the outer circumferential portion of the wall surface of the fixed sheave on the side opposite to the movable sheave.

The sixth aspect of the present invention provides the belt type continuously variable transmission for a vehicle recited in any one of the first, third to fifth aspects of the present invention, wherein the parking gear includes a stopper portion projected from the inner circumferential side of the annular projecting portion of the main body portion toward the wall surface of the fixed sheave on the side opposite to the movable sheave, and wherein when a pressing force preliminarily applied to the fixed sheave from the annular projecting portion to the fixed sheave reaches a predetermined value defined in advance, the stopper portion abuts on the wall surface of the opposite side to limit the application of the pressing force from the annular projecting portion to the fixed sheave.

The seventh aspect of the present invention provides the belt type continuously variable transmission for a vehicle recited in any one of the first, third to sixth aspects of the present invention, wherein the parking gear is tightened by a nut screwed to a shaft end portion of the one shaft and is clamped in the shaft center direction with the fixed sheave.

The eighth aspect of the present invention provides the belt type continuously variable transmission for a vehicle recited in any one of the first, third to seventh aspects of the present invention, wherein comprising an oil pressure chamber made of a space surrounded in an oil-tight manner by the main body portion and the annular projecting portion of the parking gear and the fixed sheave to generate the pressing force pressing the wall surface of the fixed sheave on the side opposite to the movable sheave toward the movable sheave when a predetermined oil pressure is supplied.

The Effects of the Invention

In the belt type continuously variable transmission for a vehicle recited in the first aspect of the present invention, the groove width variable pulley includes a fixed sheave fixed to an outer circumferential surface of one of the input shaft and the output shaft, and a movable sheave disposed relatively non-rotatably on the one shaft and relatively movably in the direction of the shaft center of the one shaft so as to form the V-groove for clamping the transmission belt with the fixed sheave, and wherein since the belt type continuously variable transmission for a vehicle is disposed with a parking gear having a disc-shaped main body portion fixed to the one shaft on the side opposite to the movable sheave relative to the fixed sheave, and an annular projecting portion projecting from the main body portion toward a wall surface of the fixed sheave on the side opposite to the movable sheave and abutting on the wall surface of the opposite side on the outer circumferential side than the minimum winding diameter of the transmission belt, even if the reaction force in the direction of the shaft center is applied from the transmission belt to the fixed sheave by clamping the transmission belt between the fixed sheave and the movable sheave, the wall surface of the fixed sheave on the side opposite to the transmission belt is supported on the outer circumferential side than the minimum winding diameter of the transmission belt by having only a relatively simple change of forming the annular projecting portion as compared to the parking gear conventionally used and, therefore, the fall of the fixed sheave can be suppressed without adding a part with a relatively simple configuration. And, since the annular projecting portion of the parking gear abuts on the wall surface of the fixed sheave on the side opposite to the movable sheave at a radial position corresponding to the maximum winding diameter of the transmission belt, even if the maximum reaction force in the direction of the shaft center is applied from the transmission belt to the fixed sheave by clamping the transmission belt located at the maximum winding diameter between the fixed sheave and the movable sheave, the annular projecting portion of the parking gear supports the position in the wall surface of the fixed sheave on the side opposite to the transmission belt corresponding to the point of action of the maximum reaction force in the direction of the shaft center, i.e., in the direction of action of the reaction force and, therefore, the fall of the fixed sheave can preferably be suppressed even when the maximum reaction force acts on the fixed sheave.

In the belt type continuously variable transmission for a vehicle recited in the third aspect of the present invention, since the annular projecting portion of the parking gear abuts on the wall surface, on the side opposite to the movable sheave, of the fixed sheave of the groove width variable pulley disposed on the output shaft, even if the reaction force in the direction of the shaft center is applied from the transmission belt to the fixed sheave fixed by the output shaft, the fixed sheave is supported by the parking gear conventionally fixed to the output shaft and, therefore, the fall of the fixed sheave can be suppressed without adding a part with a relatively simple configuration.

In the belt type continuously variable transmission for a vehicle recited in the fourth aspect of the present invention, since the annular projecting portion of the parking gear is fitted into and radially engaged with an annular fitting portion projected toward the parking gear from an outer circumferential portion of the wall surface of the fixed sheave on the side opposite to the movable sheave, even if the reaction force in the direction orthogonal to the shaft center is applied from the transmission belt to the fixed sheave by clamping the transmission belt between the fixed sheave and the movable sheave, the reaction force is applied to the parking gear and, therefore, the fall of the fixed sheave can be further suppressed.

In the belt type continuously variable transmission for a vehicle recited in the fifth aspect of the present invention, since the annular projecting portion of the parking gear is circumferentially engaged with engagement teeth formed on the outer circumferential portion of the wall surface of the fixed sheave on the side opposite to the movable sheave, when the non-rotating member engages with the parking gear for non-rotatably fixing the fixed shaft by the parking gear, the reaction force applied from the non-rotating member to the parking gear is applied to the engagement portion between the parking gear and the fixed sheave and, therefore, the fitting portion between the parking gear and the shaft can be shortened or eliminated in the direction of the shaft center. For example, when the parking gear is conventionally made by the spline fitting to the shaft, the length of the spline fitting portion can be shortened or eliminated in the direction of the shaft center. Therefore, since the forming cost of the fitting portion (spline fitting portion) can be reduced or eliminated and the length of the shaft can be shortened, the manufacturing cost of the belt type continuously variable transmission for a vehicle can be reduced.

In the belt type continuously variable transmission for a vehicle recited in the sixth aspect of the present invention, since the parking gear includes a stopper portion projected from the inner circumferential side of the annular projecting portion of the main body portion toward the wall surface of the fixed sheave on the side opposite to the movable sheave, and wherein when a pressing force preliminarily applied to the fixed sheave from the annular projecting portion to the fixed sheave reaches a predetermined value defined in advance, the stopper portion abuts on the wall surface of the opposite side to limit the application of the pressing force from the annular projecting portion to the fixed sheave, if the parking gear is fixed at the position where the stopper portion abuts on the wall surface on the opposite side, the pressing force (preload) toward the fixed sheave preliminarily applied to the parking gear can uniformly be set and the pressing force can easily be adjusted. Therefore, the pressing force can be adjusted by, for example, manual operation without using a special device such as a preload adjusting device.

In the belt type continuously variable transmission for a vehicle recited in the seventh aspect of the present invention, since the parking gear is tightened by a nut screwed to a shaft end portion of the one shaft and is clamped in the shaft center direction with the fixed sheave, the pressing force to the fixed sheave from the parking gear in the direction opposite to the direction of the action of the reaction force acts on the fixed sheave from the transmission belt is preliminarily applied to the fixed sheave and, therefore, the fall of the fixed sheave can preferably be suppressed even when the reaction force acts on the fixed sheave from the transmission belt.

In the belt type continuously variable transmission for a vehicle recited in the eighth aspect of the present invention, since an oil pressure chamber is included that is made of a space surrounded in an oil-tight manner by the main body portion and the annular projecting portion of the parking gear and the fixed sheave to generate the pressing force pressing the wall surface of the fixed sheave on the side opposite to the movable sheave toward the movable sheave when a predetermined oil pressure is supplied, even if the reaction force in the direction of the shaft center is applied from the transmission belt to the fixed sheave by clamping the transmission belt between the fixed sheave and the movable sheave, the pressing force is generated by the oil pressure chamber formed by having only a relatively simple change of forming the annular projecting portion as compared to the parking gear conventionally used and the fixed sheave and acts on the back surface of the fixed sheave to resist the reaction force and, therefore, the fall of the fixed sheave can be suppressed without adding a part with a relatively simple configuration.

The hydraulic cylinder included in the groove width variable pulley for moving the movable sheave of the groove width variable pulley disposed on the one shaft in the shaft center direction is configured to be actuated by an oil pressure supplied through the oil passage formed within the one shaft, and the oil pressure chamber is supplied with a portion of the oil pressure supplied to the hydraulic cylinder, through an oil pressure supply hole formed radially penetrating the inner circumferential side of the oil pressure chamber from the oil passage within the one shaft. As a result, the oil pressure can be supplied to the oil pressure chamber by making only a relatively simple change, i.e., by forming the oil pressure supply hole in the one shaft.

BEST MODES FOR CARRYING OUT THE INVENTION

One embodiment of the present invention will now be described in detail with reference to the drawings. In the following embodiments, the figures are simplified or deformed as needed for ease of description and are not necessarily accurately drawn in terms of dimensional ratios, shapes, etc., of portions.

First Embodiment

Figure 1:
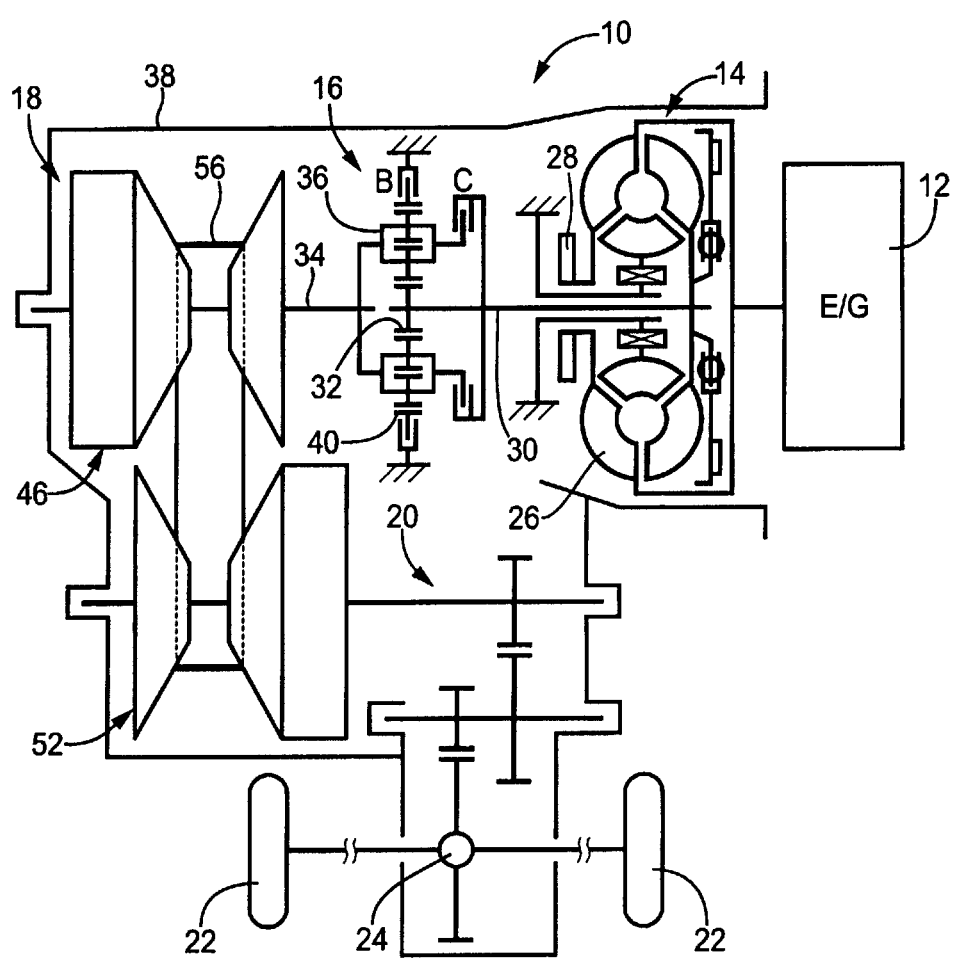
FIG. 1 is a schematic of a vehicle power transmission device to which the present invention is preferably applied.

FIG. 1 is a schematic of a vehicle power transmission device 10 to which the present invention is preferably applied.

In FIG. 1, the vehicle power transmission device 10 is for an FF (front-engine front-drive) vehicle and is coupled to an engine 12 well-known as a vehicle drive source. The vehicle power transmission device 10 includes a torque converter 14 well-known as a hydraulic power transmission using fluid as a medium to transmit the torque of the engine 12; a forward/reverse switching device 16 switching a rotation direction of the torque transmitted from the torque converter 14 between the rotation direction for forward running of a vehicle and the opposite direction thereof; i.e., the inverse rotation direction for reverse running of a vehicle; a belt type continuously variable transmission for a vehicle (hereinafter referred to as a continuously variable transmission) 18 converting the torque transmitted via the forward/reverse switching device 16 into a torque corresponding to a load; a reduction gear device 20 coupled to the output side of the continuously variable transmission 18; and a well-known so-called bevel gear type differential gear device 24 transmitting the torque transmitted via the reduction gear device 20 to a pair of left and right wheels 22 while allowing a rotation difference thereof. A pump impeller 26 of the torque converter 14 is disposed with a mechanical oil pump 28 generating an oil pressure etc., used for the shift control of the continuously variable transmission 18 and the forward/reverse switching control of the forward/reverse switching device 16, for example.

The forward/reverse switching device 16 is mainly made up of a double pinion type planetary gear device including a sun gear 32 coupled to a turbine shaft 30 of the torque converter 14 in a power transmittable manner, a carrier 36 coupled to an input shaft 34 of the continuously variable transmission 18 and selectively coupled via a forward clutch C to the turbine shaft 30, and a ring gear 40 selectively coupled via a reverse brake B to a transaxle case 38 housing the forward/reverse switching device 16, the continuously variable transmission 18, the differential gear device 24, etc. Both the forward clutch C and the reverse brake B are hydraulic friction engagement devices caused to be frictionally engaged by supplying an oil pressure from the oil pump 28.

In the forward/reverse switching device 16, the planetary gear device is put into the integrally rotating state by engaging the forward clutch C and releasing the reverse brake B and a forward power transmission path is established. If the forward power transmission path is established, the torque transmitted from the torque converter 14 is transmitted to the continuously variable transmission 18 without changing the rotation direction. In the forward/reverse switching device 16, the planetary gear device is put into the input/output inversely rotating state by engaging the reverse brake B and releasing the forward clutch C and a reverse power transmission path is established. If the reverse power transmission path is established, the torque transmitted from the torque converter 14 is transmitted to the continuously variable transmission 18 with the rotation direction reversed. By releasing both the forward clutch C and the reverse brake B, the forward/reverse switching device 16 is put into a neutral state (interrupted state) in which the power transmission is interrupted.

Figure 2:
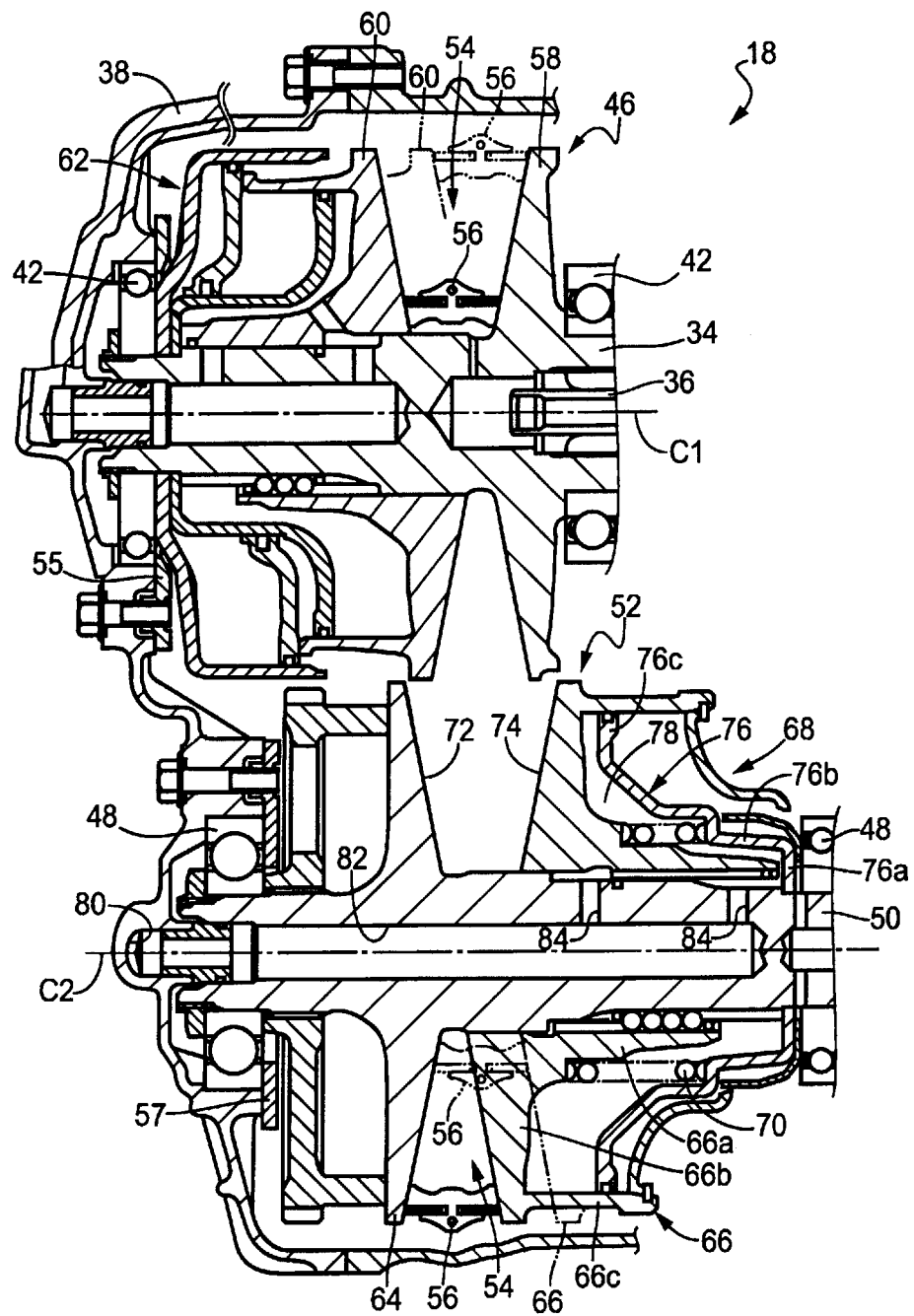
FIG. 2 is a cross-sectional view of an actual configuration of the continuously variable transmission of one embodiment of the present invention in the vehicle power transmission device of FIG. 1.

FIG. 2 is a cross-sectional view of a configuration of the continuously variable transmission 18 of one embodiment of the present invention in the vehicle power transmission device 10 of FIG. 1. In FIG. 2, the continuously variable transmission 18 includes the input shaft 34 rotatably supported around a shaft center C1 via a pair of bearings 42 by the transaxle case 38; a primary pulley (groove width variable pulley) 46 disposed on the outer circumferential side of the input shaft 34; an output shaft 50 disposed in parallel with the input shaft 34 and rotatably supported around a shaft center C2 via a pair of bearings 48 by the transaxle case 38; a secondary pulley (groove width variable pulley) 52 disposed on the outer circumferential side of the input shaft 34; and a well-known endless annular transmission belt 56 wound around each of V-grooves 54 of the primary pulley 46 and the secondary pulley 52 to transmit power through a frictional force between the both pulleys. Out of the pair of the bearings 42 and the pair of the bearings 48, the bearing 42 and the bearing 48 fitted into the inner circumferential surface of the transaxle case 38 on the side opposite to the forward/reverse switching device 16 depicted in FIG. 1 are respectively prevented from moving in the directions of the shaft centers C1 and C2 by annular disc-shaped fixed plates 55 and 57 each fixed by a bolt to the transaxle case 38.

The primary pulley 46 includes a fixed sheave 58 fixed to the outer circumferential side of the input shaft 34; a movable sheave 60 disposed relatively non-rotatably on the input shaft 34 and relatively movably in the direction of the shaft center C1 of the input shaft 34 so as to form the V-groove 54 with the fixed sheave 58; and a hydraulic actuator 62 moving the movable sheave 60 in the direction of the shaft center C1 depending on a supplied oil pressure and making the movable sheave 60 and the fixed sheave 58 closer or further to each other so as to vary the groove width of the V-groove 54. The secondary pulley 52 includes a fixed sheave 64 fixed to the outer circumferential side of the output shaft 50; a movable sheave 66 disposed relatively non-rotatably on the output shaft 50 and relatively movably in the direction of the shaft center C2 of the output shaft 50 so as to form the V-groove 54 with the fixed sheave 64; and a hydraulic actuator 68 moving the movable sheave 66 in the direction of the shaft center C2 depending on a supplied oil pressure and making the movable sheave 66 and the fixed sheave 64 closer or further to each other so as to vary the groove width of the V-groove 54. The primary pulley 46 and the secondary pulley 52 are groove width variable pulleys having the same configuration except that the hydraulic actuator 68 of the secondary pulley 52 is of a single piston type while the hydraulic actuator 62 of the primary pulley 46 is of a double piston type and that the hydraulic actuator 68 of the secondary pulley 52 is disposed with a coil spring 70 always biasing the movable sheave 66 toward the fixed sheave 64 while the hydraulic actuator 62 of the primary pulley 46 is not disposed with such a spring. The secondary pulley 52 will hereinafter be described in detail as a representative of the primary pulley 46 and the secondary pulley 52.

The fixed sheave 64 is an annular disc-shaped member integrally disposed on the output shaft 50 and projecting from the outer circumferential surface of the output shaft 50 toward the outer circumferential side. The fixed sheave 64 has a taper surface 72 formed on a surface facing the movable sheave 60 with a distance from the movable sheave 60 increasing toward the outer circumferential side.

The movable sheave 66 has an inner cylindrical portion 66a fitted to the output shaft 50 relatively movably in the direction of the shaft center C2 in a ball spline method and relatively non-rotatably around the shaft center C2; a disc portion 66b that is an annular disc-shaped member integrally disposed and projecting from one end portion of the cylindrical portion 66a closer to the fixed sheave 64 toward the outer circumferential side and that has a taper surface 74 on a surface facing the fixed sheave 64 with a distance from the fixed sheave 64 increasing toward the outer circumferential side; and an outer cylindrical portion 66c projected from the outer circumferential portion of the disc portion 66b toward the side opposite to the fixed sheave 64 in the direction of the shaft center C2. The taper surface 74 forms the V-shaped V-groove 54 with the taper surface 72 of the fixed sheave 64.

The hydraulic actuator 68 includes a cylinder member 76 having an inner circumferential wall portion 76a located at one end portion of the output shaft 50 on the side opposite to the fixed sheave 64 relative to the movable sheave 66 and having an inner circumferential portion sandwiched between a stepped end surface of the one end portion and the bearing 48; a cylindrical portion 76b extended from the outer circumferential portion of the inner circumferential wall portion 76a toward the disc portion 66b of the movable sheave 66; and an outer circumferential wall portion 76c projected from one end portion of the cylindrical portion 76b closer to the movable sheave 66 continuously in a circumferential direction toward the outer circumference and sliding via an oil seal on the inner circumferential surface of the outer cylindrical portion 66c of the movable sheave 66. An oil pressure chamber 78 is formed in a space surrounded in an oil-tight manner by the cylinder member 76, the movable sheave 66, and the output shaft 50. The oil pressure chamber 78 is supplied with oil pressure through each of a first oil passage 80 formed in the transaxle case 38 and supplied with an oil pressure via a hydraulic control device not depicted adjusting the oil pressure generated by the oil pump 28; a second oil passage 82 formed on the inner circumferential side of the output shaft 50; and a third oil passage 84 formed to radially penetrate the output shaft 50. The coil spring 70 is disposed between a stepped end surface formed on the outer circumferential surface of the inner cylindrical portion 66a of the movable sheave 66 and a stepped end surface formed on the inner circumferential surface of the cylindrical portion 76b of the cylinder member 76.

In this secondary pulley 52, the movable sheave 66 moves closer to or further away from the fixed sheave 64 in the direction of the shaft center C1 depending on the oil pressure supplied to the oil pressure chamber 78 to change the width of the V-groove 54. In FIG. 2, the movable sheave 66 indicated by a solid line on the lower side of the shaft center C2 indicates the state of the minimum width of the V-groove 54 formed with the fixed sheave 64. In this state, the winding diameter of the transmission belt 56 is maximized. The movable sheave 66 indicated by a solid line on the upper side and by a dashed-two dotted line on the lower side of the shaft center C2 indicates the state of the maximum width of the V-groove 54 formed with the fixed sheave 64. In this state, the winding diameter of the transmission belt 56 is minimized.

Figure 3:
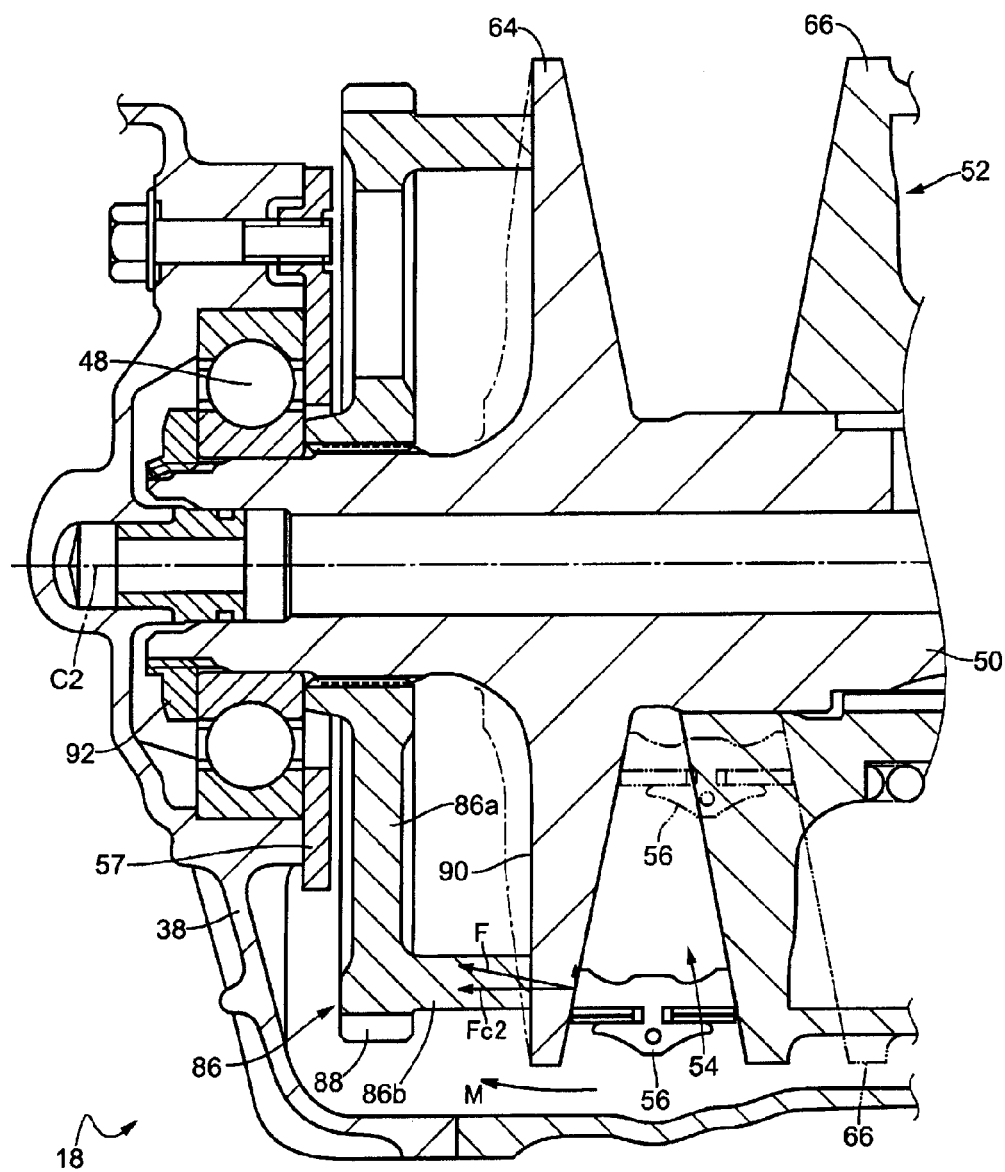
FIG. 3 is an enlarged cross-sectional view of the secondary pulley and one end portion of the output shaft of the continuously variable transmission of FIG. 2.

FIG. 3 is an enlarged cross-sectional view of the secondary pulley 52 and one end portion of the output shaft 50 of the continuously variable transmission 18 of FIG. 2. In FIG. 3, a parking gear 86 for non-rotatably fixing the output shaft 50 is fixed to the output shaft 50 between the secondary pulley 52 and the bearing 48. The parking gear 86 has a disc-shaped main body portion 86a fixed by, for example, the spline fitting to the output shaft 50 on the side opposite to the movable sheave 66 relative to the fixed sheave 64, and an annular projecting portion 86b projecting from the main body portion 86a toward the wall surface of the fixed sheave 64 on the side opposite to the movable sheave 66, i.e., a back surface 90, and abutting on the back surface 90 at a radial position corresponding to the maximum winding diameter of the transmission belt 56. On the outer circumferential surface of the main body portion 86a, outer circumferential teeth 88 are formed that are engageable with a parking pole not depicted disposed on a non-rotating member such as the transaxle case 38, for example. The output shaft 50 is fixed non-rotatably around the shaft center C2 by engaging the parking pole with the outer circumferential teeth 88 of the parking gear 86.

The parking gear 86 is clamped in the direction of the shaft center C2 between the bearing 48 and the fixed sheave 64 by tightening a nut 92 screwed to a shaft end portion of the output shaft 50 on the side opposite to the parking gear 86 relative to the bearing 48 while the main body portion 86a is fitted to one end portion of the output shaft 50 in a state of interference fitting or loose fitting, for example, and interposed between the bearing 48 and the fixed sheave 64 in the direction of the shaft center C2. As a result, a pressing force (preload) from the annular projecting portion 86b of the parking gear 86 toward the fixed sheave 64 is preliminarily applied to the fixed sheave 64. This pressing force is adjusted to a predetermined value defined in advance, for example, in accordance with a preliminarily empirically obtained relationship between a tightening torque of the nut 92 and the pressing force, by adjusting the tightening torque. The predetermined value is set to a larger value as much as possible within a range in which the fixed sheave 64 is not deformed toward the movable sheave 66, for example. The annular projecting portion 86b of the parking gear 86 of this embodiment is different from an annular projecting portion 104b of a conventional parking gear 104 depicted in FIG. 10 in that the annular projecting portion 86b is formed on the outer circumferential side.

In the continuously variable transmission 18 configured as above, the groove widths of the V-grooves 54 of the primary pulley 46 and the secondary pulley 52 are respectively changed and the clamping force to the transmission belt 56 is adjusted by adjusting and controlling a primary oil pressure supplied to the hydraulic actuator 62 of the primary pulley 46 with the hydraulic control device and by adjusting and controlling a secondary oil pressure supplied to the hydraulic actuator 68 of the secondary pulley 52 with the hydraulic control device. When the groove widths of the V-grooves 54 of the primary pulley 46 and the secondary pulley 52 are changed as described above, the winding diameter of the transmission belt 56 is changed and a rotation speed ratio (gear ratio) of the input shaft 34 and the output shaft 50 varies in a stepless manner. For example, on the upper side of the shaft center C1 and the lower side of the shaft center C2 of FIG. 2, the transmission belt 56 indicated by solid lines indicates the state of the gear radio of the continuously variable transmission 18 set to the maximum gear ratio when the winding diameter at the primary pulley 46 is the minimum value and the winding diameter at the secondary pulley 52 is the maximum value. In FIG. 2, the transmission belt 56 indicated by dashed-two dotted lines indicates the state of the gear radio of the belt type continuously variable transmission 18 set to the minimum gear ratio when the winding diameter at the primary pulley 46 is the maximum value and the winding diameter at the secondary pulley 52 is the minimum value.

The fixed sheave 64 and the movable sheave 66 of the secondary pulley 52 apply a clamping force in the direction of the shaft center C2 to the transmission belt 56 while a reaction force from the transmission belt 56 is applied thereto. As depicted in FIG. 3, the fixed sheave 64 is affected by a moment M causing the fixed sheave 64 to fall toward the side opposite to the movable sheave 66 with a base portion, i.e., an inner circumferential potion of the fixed sheave 64 used as a fulcrum due to a shaft-center-direction reaction force Fc2 that is a component in the direction of the shaft center C2 of a reaction force F applied from the transmission belt 56. The reaction force and the moment M are maximized when the winding diameter of the transmission belt 56 is maximized as indicated by solid line in FIG. 3. The parking gear 86 abuts on the back surface 90 of the fixed sheave 64 on the side of falling of the fixed sheave 64 due to the moment M. To the fixed sheave 64, the pressing force acting in the opposite direction of the shaft-center-direction reaction force Fc2 is preliminarily applied. Additionally, the pressing force is applied to a position in the back surface 90 of the fixed sheave 64 at the point of action and against the direction of action of the maximum shaft-center-direction reaction force Fc2 applied from the transmission belt 56 to the fixed sheave 64. Therefore, the parking gear 86 of this embodiment functions as a member supporting the fixed sheave 64 to resist the shaft-center-direction reaction force Fc2 (bending moment M).

In the continuously variable transmission 18 of this embodiment, the secondary pulley (groove width variable pulley) 52 includes the fixed sheave 64 fixed to the outer circumferential surface of the output shaft 50 (one of the input shaft and the output shaft) and the movable sheave 66 disposed relatively non-rotatably around the shaft center C2 and relatively movably in the direction of the shaft center C2 on the output shaft 50 so as to form the V-groove 54 for clamping the transmission belt 56 with the fixed sheave 64 and since the parking gear 86 is disposed that has the disc-shaped main body portion 86a fixed by, for example, the spline fitting to the output shaft 50 on the side opposite to the movable sheave 66 relative to the fixed sheave 64 and the annular projecting portion 86b projecting from the main body portion 86a toward the wall surface of the fixed sheave 64 on the side opposite to the movable sheave 66, i.e., the back surface 90, and abutting on the back surface 90 at a radial position corresponding to the maximum winding diameter of the transmission belt 56, even if the shaft-center-direction reaction force Fc2 in the direction of the shaft center C2 is applied from the transmission belt 56 to the fixed sheave 64 by clamping the transmission belt 56 between the fixed sheave 64 and the movable sheave 66, the back surface 90 of the fixed sheave 64 on the side opposite to the transmission belt 56 is supported on the outer circumferential side than the minimum winding diameter of the transmission belt 56 by the parking gear 86 having only a relatively simple change of forming the annular projecting portion 86b as compared to those conventionally fixed to the output shaft 50 and, therefore, the fall of the fixed sheave 64 can be suppressed without adding a part with a relatively simple configuration.

In the continuously variable transmission 18 of this embodiment, since the annular projecting portion 86b of the parking gear 86 abuts on the back surface 90 of the fixed sheave 64 at a radial position corresponding to the maximum winding diameter of the transmission belt 56, even if the maximum shaft-center-direction reaction force Fc2 in the direction of the shaft center C2 is applied from the transmission belt 56 to the fixed sheave 64 by clamping the transmission belt 56 located at the maximum winding diameter between the fixed sheave 64 and the movable sheave 66, the annular projecting portion 86b of the parking gear 86 supports the position in the back surface 90 of the fixed sheave 64 corresponding to the point of action of the maximum shaft-center-direction reaction force Fc2 in the direction of action of the shaft-center-direction reaction force Fc2 and, therefore, the fall of the fixed sheave 64 can preferably be suppressed even when the maximum shaft-center-direction reaction force Fc2 acts on the fixed sheave 64.

In the continuously variable transmission 18 of this embodiment, since the parking gear 86 is clamped in the direction of the shaft center C2 with the fixed sheave 64 by tightening the nut 92 screwed to the shaft end portion of the output shaft 50 and the pressing force (preload) from the parking gear 86 toward the fixed sheave 64, i.e., a force in the opposite direction of the shaft-center-direction reaction force Fc2 is preliminarily applied to the fixed sheave 64, the fall of the fixed sheave 64 can preferably be suppressed even when the shaft-center-direction reaction force Fc2 toward the parking gear 86 acts on the fixed sheave 64.

In the continuously variable transmission 18 of this embodiment, since the pressing force preliminarily applied from the parking gear 86 to the fixed sheave 64 is set to a larger value as much as possible within a range in which the fixed sheave 64 is not deformed toward the movable sheave 66, the fall of the fixed sheave 64 can preferably be suppressed while the power transmission efficiency is prevented from deteriorating because of the deformation of the fixed sheave 64 toward the movable sheave 66 due to the pressing force.

Figure 10:
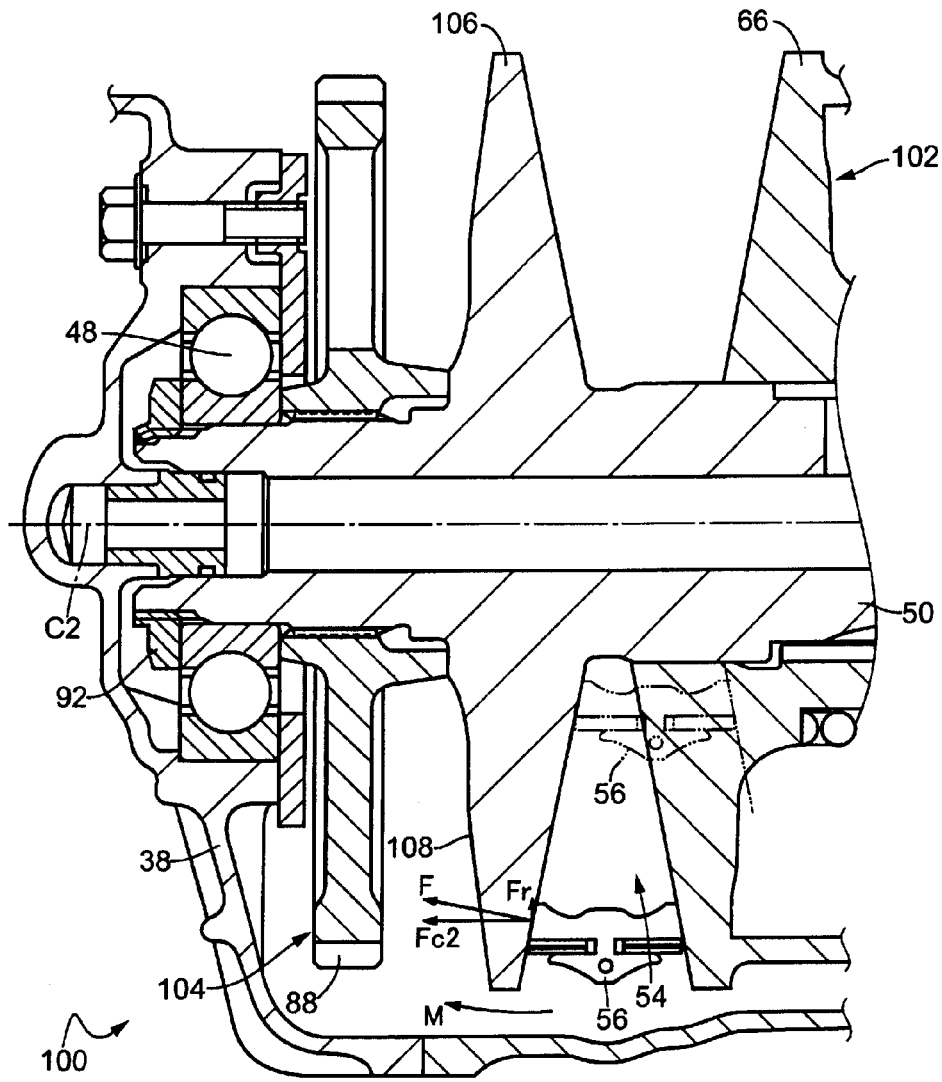
FIG. 10 is an enlarged cross-sectional view of a secondary pulley and a parking gear of a conventional continuously variable transmission.
Figure 11:
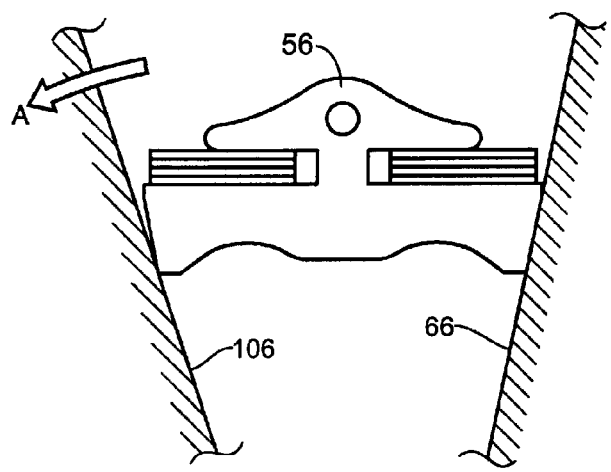
FIG. 11 is a diagram representing that since the fixed sheave falls toward the side opposite to the movable sheave, the contact area between the fixed sheave and the transmission belt is reduced in the conventional continuously variable transmission depicted in FIG. 10.

FIG. 10 is a cross-sectional view of a secondary pulley 102 and the parking gear 104 in a conventional continuously variable transmission 100, corresponding to FIG. 3 of the first embodiment. As depicted in FIG. 10, in the conventional parking gear 104, the annular projecting portion 104b abuts on a base portion of a fixed sheave 106, i.e., a radial position on the inner circumferential side than the minimum winding diameter of the transmission belt 56 in a back surface 108 of the fixed sheave 106. Therefore, if the shaft-center-direction reaction force Fc2 in the direction of the shaft center C2 is applied from the transmission belt 56 to the fixed sheave 106 by clamping the transmission belt 56 between the fixed sheave 106 and the movable sheave 66 of the secondary pulley 102, since the fixed sheave 106 falls toward the side opposite to the movable sheave 66 as indicated by an arrow A in FIG. 11, the contact area between the fixed sheave 106 and the transmission belt 56 is problematically reduced, deteriorating the power transmission efficiency. Therefore, the thickness of the fixed sheave 106 is increased in the direction of the shaft center C2 to improve the strength as a countermeasure in the conventional continuously variable transmission 100; however, this is disadvantageous because the material cost of the fixed sheave 106 increases along with an increase in the manufacturing cost of the continuously variable transmission 100 and the weight of the continuously variable transmission 100 increases.

On the other hand, in the continuously variable transmission 18 of this embodiment, since the back surface 90 of the fixed sheave 64 is supported by the annular projecting portion 86b of the parking gear 86, the fall of the fixed sheave 64 can be suppressed even if the thickness of the fixed sheave 64 in the direction of the shaft center C2 is reduced as compared to the conventional fixed sheave 106 indicated by dashed-two dotted lines of FIG. 3. Therefore, as compared to the conventional continuously variable transmission 100, this is advantageous because the material cost of the fixed sheave 64 decreases along with decrease in the manufacturing cost of the continuously variable transmission 18 and the weight of the continuously variable transmission 18 is reduced.

Second Embodiment

Other embodiments of the present invention will be described. In the following description of the embodiments, the portions of the embodiments overlapping with each other are denoted by the same reference numerals and will not be described.

Figure 4:
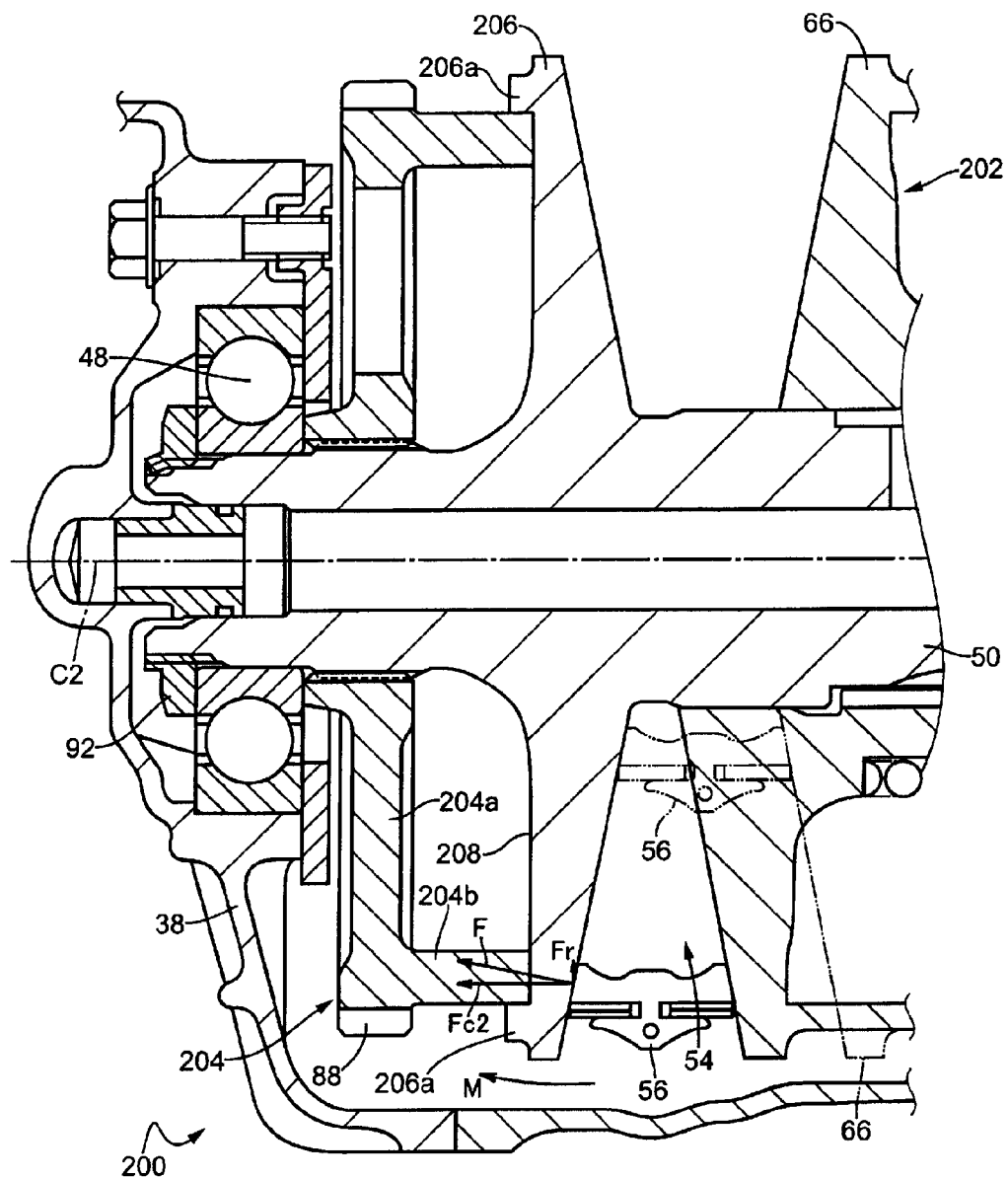
FIG. 4 is an enlarged cross-sectional view of a secondary pulley and a parking gear of a continuously variable transmission of another embodiment of the present invention.

FIG. 4 is an enlarged cross-sectional view of a secondary pulley 202 and a parking gear 204 of a continuously variable transmission 200 of another embodiment of the present invention. As depicted in FIG. 4, a fixed sheave 206 of the secondary pulley 202 includes an annular fitting portion 206a projected from an outer circumferential portion of a back surface 208 on the side opposite to the movable sheave 66 toward the parking gear 204. The parking gear 204 includes an annular disc-shaped main body portion 204a fixed to an outer circumferential surface of the output shaft 50, and an annular projecting portion 204b projected from the main body portion 204a toward the fixed sheave 206 and fitted into and radially engaged with the annular fitting portion 206a of the fixed sheave 206. The parking gear 204 is clamped in the direction of the shaft center C2 between the bearing 48 and the fixed sheave 206 by tightening the nut 92 screwed to the shaft end portion of the output shaft 50 on the side opposite to the parking gear 204 relative to the bearing 48 while the main body portion 204a is fitted to one end portion of the output shaft 50 in a state of interference fitting or loose fitting, for example, and interposed between the bearing 48 and the fixed sheave 206 in the direction of the shaft center C2. As a result, a pressing force (preload) from the parking gear 204 toward the fixed sheave 206 is applied to the fixed sheave 206. This pressing force is adjusted to a predetermined value defined in advance, for example, in accordance with a preliminarily empirically obtained relationship between the tightening torque of the nut 92 and the pressing force by adjusting the tightening torque. The predetermined value is set to a larger value as much as possible within a range in which the fixed sheave 206 is not deformed toward the movable sheave 66, for example. The preliminary application of the pressing force (preload) from the parking gear 204 to the fixed sheave 206 by tightening the nut 92 screwed to the shaft end portion of the output shaft 50 as described above is the same in parking gears of the following third to fifth embodiments and will not be described in the following embodiments.

In the continuously variable transmission 200 configured as above, the fixed sheave 206 is affected by the moment M causing the fixed sheave 206 to fall toward the side opposite to the movable sheave 66 with a base portion, i.e., an inner circumferential portion of the fixed sheave 206 used as a fulcrum due to the shaft-center-direction reaction force Fc2 applied from the transmission belt 56. The parking gear 204 abuts on the back surface 208 of the fixed sheave 206 on the side of falling of the fixed sheave 206 due to the moment M. To the fixed sheave 206, the pressing force acting in the opposite direction of the shaft-center-direction reaction force Fc2 is preliminarily applied. Additionally, the pressing force is applied to a position in the back surface 208 of the fixed sheave 206 at the point of action and against the direction of action of the maximum shaft-center-direction reaction force Fc2 applied from the transmission belt 56 to the fixed sheave 206. Therefore, the parking gear 204 of this embodiment functions as a member supporting the fixed sheave 206 to resist the shaft-center-direction reaction force Fc2 (bending moment M).

Even if the moment causing the fall toward the side opposite to the movable sheave 66 is applied to the fixed sheave 206 due to the reaction force F applied from the transmission belt 56, the parking gear 204 radially supports the inner circumferential surface of the annular fitting portion 206a of the fixed sheave 206 with the annular projecting portion 204b of the parking gear 204 on the falling side. The parking gear 204 of this embodiment functions as a radially supporting member resisting a radial reaction force Fr that is a component in the direction orthogonal to the shaft center C2 of the reaction force F so as to prevent the fixed sheave 206 from falling.

In the continuously variable transmission 200 of this embodiment, since the parking gear 204 is disposed that has the disc-shaped main body portion 204a fixed to the output shaft 50 on the side opposite to the movable sheave 66 relative to the fixed sheave 206 and the annular projecting portion 204b projecting from the main body portion 204a toward the wall surface of the fixed sheave 206 on the side opposite to the movable sheave 66, i.e., the back surface 208, and abutting on the back surface 208 at a radial position corresponding to the maximum winding diameter of the transmission belt 56, even if the maximum shaft-center-direction reaction force Fc2 in the direction of the shaft center C2 is applied from the transmission belt 56 to the fixed sheave 206 by clamping the transmission belt 56 located at the maximum winding diameter between the fixed sheave 206 and the movable sheave 66, the annular projecting portion 204b of the parking gear 204 supports the position in the back surface 208 of the fixed sheave 206 corresponding to the point of action of the maximum shaft-center-direction reaction force Fc2 and the direction of action of the shaft-center-direction reaction force Fc2 and, therefore, the fall of the fixed sheave 206 can be suppressed without adding a part with a relatively simple configuration as is the case with the first embodiment.

In the continuously variable transmission 200 of this embodiment, since the annular projecting portion 204b of the parking gear 204 is fitted into and radially engaged with the annular fitting portion 206a projected from the outer circumferential portion of the back surface 208 of the fixed sheave 206 toward the parking gear 204, the radial reaction force Fr in the direction orthogonal to the shaft center C2 applied from the transmission belt 56 to the fixed sheave 206 by clamping the transmission belt 56 between the fixed sheave 206 and the movable sheave 66 is transmitted via the fixed sheave 206 and the parking gear 204 to the output shaft 50 and is distributed and applied in the direction of the shaft center C2 as compared to the case of the radial reaction force Fr transmitted only via the fixed sheave 206 and, therefore, the bending of the output shaft 50 due to the radial reaction force Fr can preferably be suppressed. Even if the radial dimension of the output shaft 50 is reduced, the bending rigidity equal to or more than the case of the radial reaction force Fr transmitted only via the fixed sheave 206 can be ensured and, therefore, the weight of the output shaft 50 can be reduced.

Third Embodiment

Figure 5:
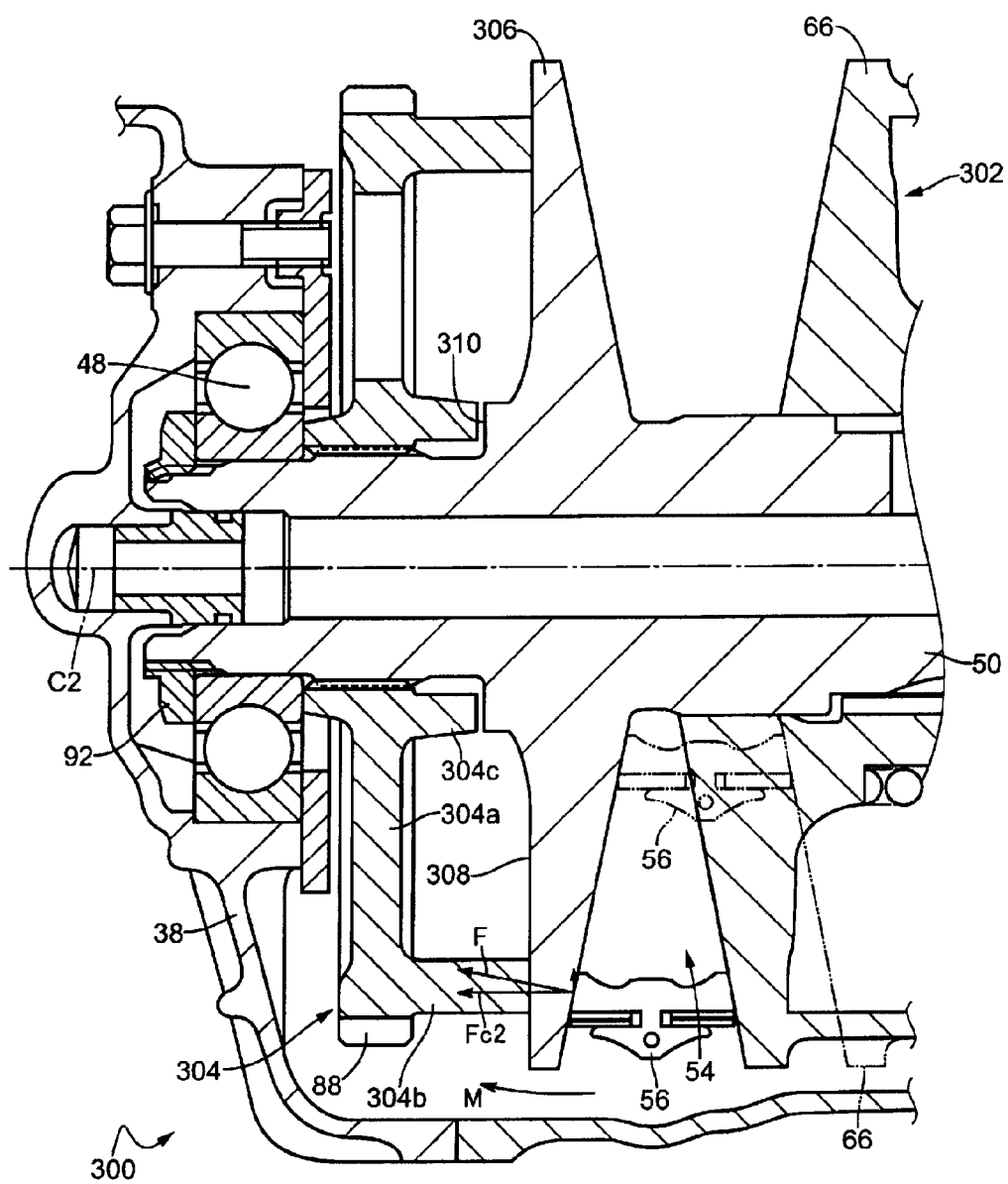
FIG. 5 is an enlarged cross-sectional view of a secondary pulley and a parking gear of a continuously variable transmission of another embodiment of the present invention.

FIG. 5 is an enlarged cross-sectional view of a secondary pulley 302 and a parking gear 304 of a continuously variable transmission 300 of another embodiment of the present invention. As depicted in FIG. 5, a fixed sheave 306 of the secondary pulley 302 has a stepped end surface 310 formed on an inner circumferential portion of a back surface 308 on the side opposite to the movable sheave 66. The parking gear 304 includes a main body portion 304a and an annular projecting portion 304b same as the main body portion 86a and the annular projecting portion 86b of the parking gear 86 of the first embodiment, and a stopper portion 304c projected from the inner circumferential side of the annular projecting portion 304b of the main body portion 304a toward the stepped end surface 310 of the back surface 308. The stopper portion 304c abuts on the stepped end surface 310 of the back surface 308 when the pressing force applied from the annular projecting portion 304b of the parking gear 304 to the fixed sheave 306 reaches a predetermined value defined in advance, so as to limit the application of the pressing force from the annular projecting portion 304b to the fixed sheave 306. The predetermined value is set to a larger value as much as possible within a range in which the fixed sheave 306 is not deformed toward the movable sheave 66, for example. Although FIG. 5 depicts a state in which a gap is formed in the direction of the shaft center C2 between the stopper portion 304c and the stepped end surface 310, this represents a stage in the middle of assembly and the stopper portion 304c and the stepped end surface 310 are actually brought into contact with each other in the direction of the shaft center C2 to apply the pressing force of the predetermined value defined in advance from the annular projecting portion 304b to the fixed sheave 306 as described above.

In the continuously variable transmission 300 configured as above, the parking gear 304 functions as a member supporting the fixed sheave 306 to resist the shaft-center-direction reaction force Fc2 (bending moment M) as is the case with the first embodiment.

The constituent elements other than those described above are the same as the first embodiment and, in the continuously variable transmission 300 of this embodiment, the fall of the fixed sheave 306 can be suppressed without adding a part with a relatively simple configuration as is the case with the first embodiment.

In the continuously variable transmission 300 of this embodiment, since the parking gear 304 includes the stopper portion 304c projected from the inner circumferential side of the annular projecting portion 304b of the main body portion 304a toward the stepped end surface 310 of the back surface 308, and the stopper portion 304c abuts on the stepped end surface 310 of the back surface 308 when the pressing force applied from the annular projecting portion 304b of the parking gear 304 to the fixed sheave 306 reaches a predetermined value defined in advance, so as to limit the application of the pressing force from the annular projecting portion 304b to the fixed sheave 306, if the parking gear 304 is fixed at the position where the stopper portion 304c abuts on the stepped end surface 310 of the back surface 308, the pressing force (preload) preliminarily applied from the parking gear 304 to the fixed sheave 306 can uniformly be set and the pressing force can easily be adjusted. Therefore, the pressing force can be adjusted by, for example, manual operation without using a special device such as a preload adjusting device.

Since the parking gear 304 is clamped in the direction of the shaft center C2 with the fixed sheave 306 by tightening the nut 92 screwed to the shaft end portion of the output shaft 50 to which the parking gear 304 is fixed, the pressing force from the parking gear 304 to the fixed sheave 306 can be applied as a predetermined value defined in advance by only tightening the nut 92 until reaching a predetermined tightening torque empirically defined in advance at which the stopper portion 304c of the parking gear 304 abuts on the stepped end surface 310 of the back surface 308 of the fixed sheave 306 and, therefore, the pressing force can easily be adjusted.

Fourth Embodiment

Figure 6:
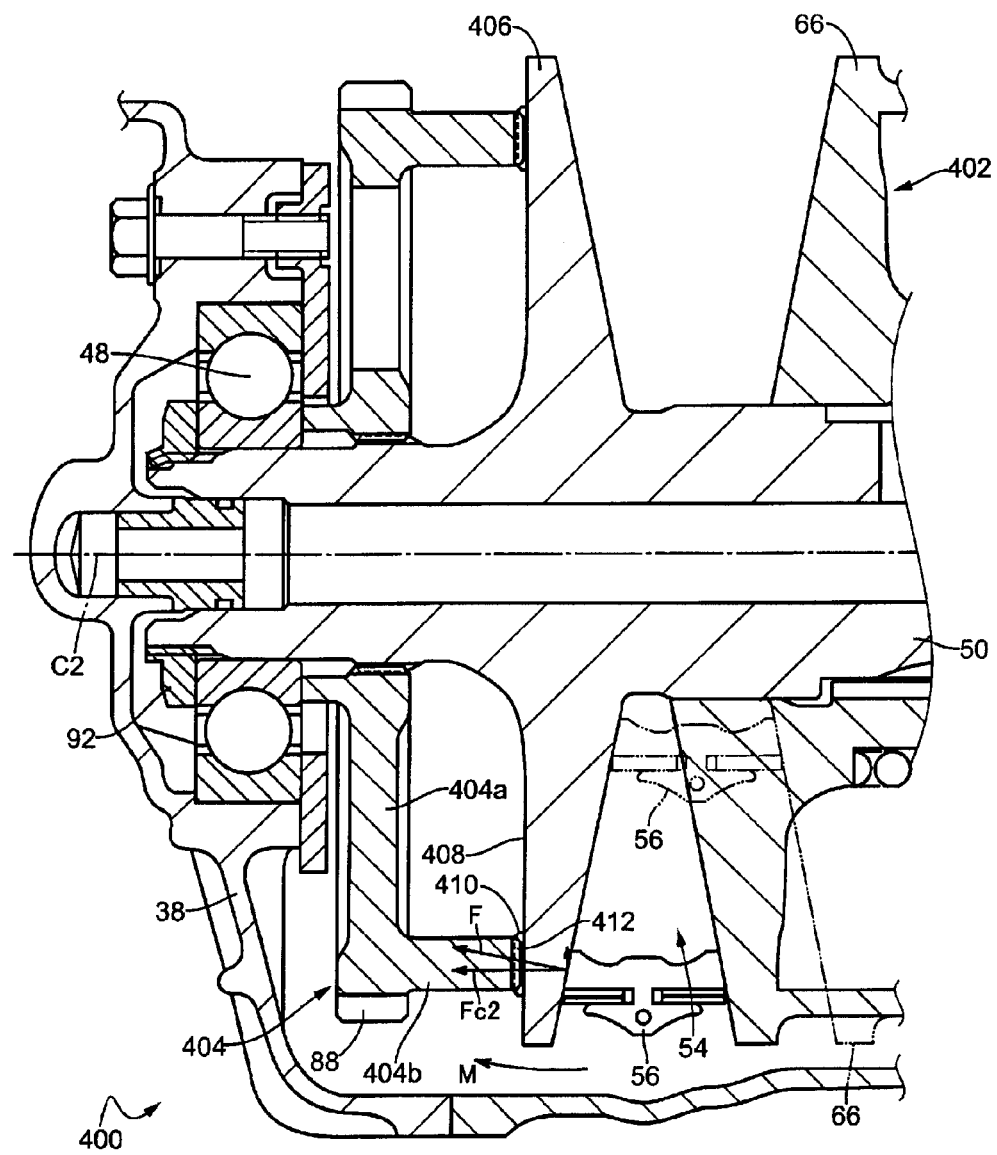
FIG. 6 is an enlarged cross-sectional view of a secondary pulley and a parking gear of a continuously variable transmission of another embodiment of the present invention.

FIG. 6 is an enlarged cross-sectional view of a secondary pulley 402 and a parking gear 404 of a continuously variable transmission 400 of another embodiment of the present invention. As depicted in FIG. 6, a fixed sheave 406 of the secondary pulley 402 has a plurality of first spline teeth (engagement teeth) 410 each extending radially around the shaft center C2 and formed sequentially in a circumferential direction in a portion including a radial position corresponding to the maximum winding diameter of the transmission belt 56 in an outer circumferential portion of a back surface 408 on the side opposite to the movable sheave 66. Although the first spline teeth 410 of this embodiment are, for example, involute splines, other splines may be available. The parking gear 404 has a main body portion 404a same as the main body portion 86a of the parking gear 86 of the first embodiment, and an annular projecting portion 404b projected from the main body portion 404a toward the back surface 408 of the fixed sheave 406 and abutting on the fixed sheave 406 at a radial position in the back surface 408 corresponding to the maximum winding diameter of the transmission belt 56. The parking gear 404 abuts in the direction of the shaft center C2 on and circumferentially engages with the fixed sheave 406 via a plurality of second spline teeth 412 each formed radially around the shaft center C2 in the leading portion of the annular projecting portion 404b and respectively engaging with a plurality of the first spline teeth 410.

In the continuously variable transmission 400 configured as above, the parking gear 404 functions as a member supporting the fixed sheave 406 to resist the shaft-center-direction reaction force Fc2 (bending moment M) as is the case with the first embodiment.

In this embodiment, the torque of the output shaft 50 is transmitted to the parking gear 404 via the engagement portion between the first spline teeth 410 and the second spline teeth 412 in addition to the spline fitting portion between the outer circumferential surface of the output shaft 50 and the inner circumferential surface of the parking gear 404. As compared to the case of transmitting the torque of the output shaft 50 to the parking gear 104 via only the spline fitting portion between the outer circumferential surface of the output shaft 50 and the inner circumferential surface of the parking gear 104 as in the conventional case depicted in FIG. 10, a length L in the direction of the shaft center C2 of the spline fitting portion between the outer circumferential surface of the output shaft 50 and the inner circumferential surface of the parking gear 404 of this embodiment is reduced by a length L1.

The constituent elements other than those described above are the same as the first embodiment and, in the continuously variable transmission 400 of this embodiment, the fall of the fixed sheave 406 can be suppressed without adding a part with a relatively simple configuration as is the case with the first embodiment.

In the continuously variable transmission 400 of this embodiment, since the annular projecting portion 404b of the parking gear 404 is circumferentially engaged via the second spline teeth 412 with the first spline teeth (engagement teeth) 410 formed on the outer circumferential portion of the wall surface of the fixed sheave 406 on the side opposite to the movable sheave 66, i.e., the back surface 408, when the parking pole engages with the outer circumferential teeth 88 of the parking gear 404 for non-rotatably fixing the output shaft 50, the reaction force, i.e., torque, applied from the parking pole to the parking gear 404 is also applied to the engagement portion between the parking gear 404 and the fixed sheave 406 in addition to the engagement portion between the parking gear 404 and the output shaft 50 and, therefore, even if the length L of the engagement portion between the parking gear 404 and the output shaft 50 is shortened in the direction of the shaft center C2, the strength equal to or more than the conventional case can be ensured for resisting the reaction force applied from the parking pole. Since the engagement portion between the first spline teeth 410 and the second spline teeth 412 is disposed on the outer circumferential side than the spline fitting portion between the outer circumferential surface of the output shaft 50 and the inner circumferential surface of the parking gear 404, the strength equal to or more than the conventional case can preferably be ensured for resisting the reaction force applied from the parking pole. Therefore, since the forming cost of the spline fitting portion between the outer circumferential surface of the output shaft 50 and the inner circumferential surface of the parking gear 404 can be reduced and the length of the output shaft 50 can be shortened by the reduced length L1 of the spline fitting portion, the manufacturing cost of the continuously variable transmission 400 can be reduced.

Fifth Embodiment

Figure 7:
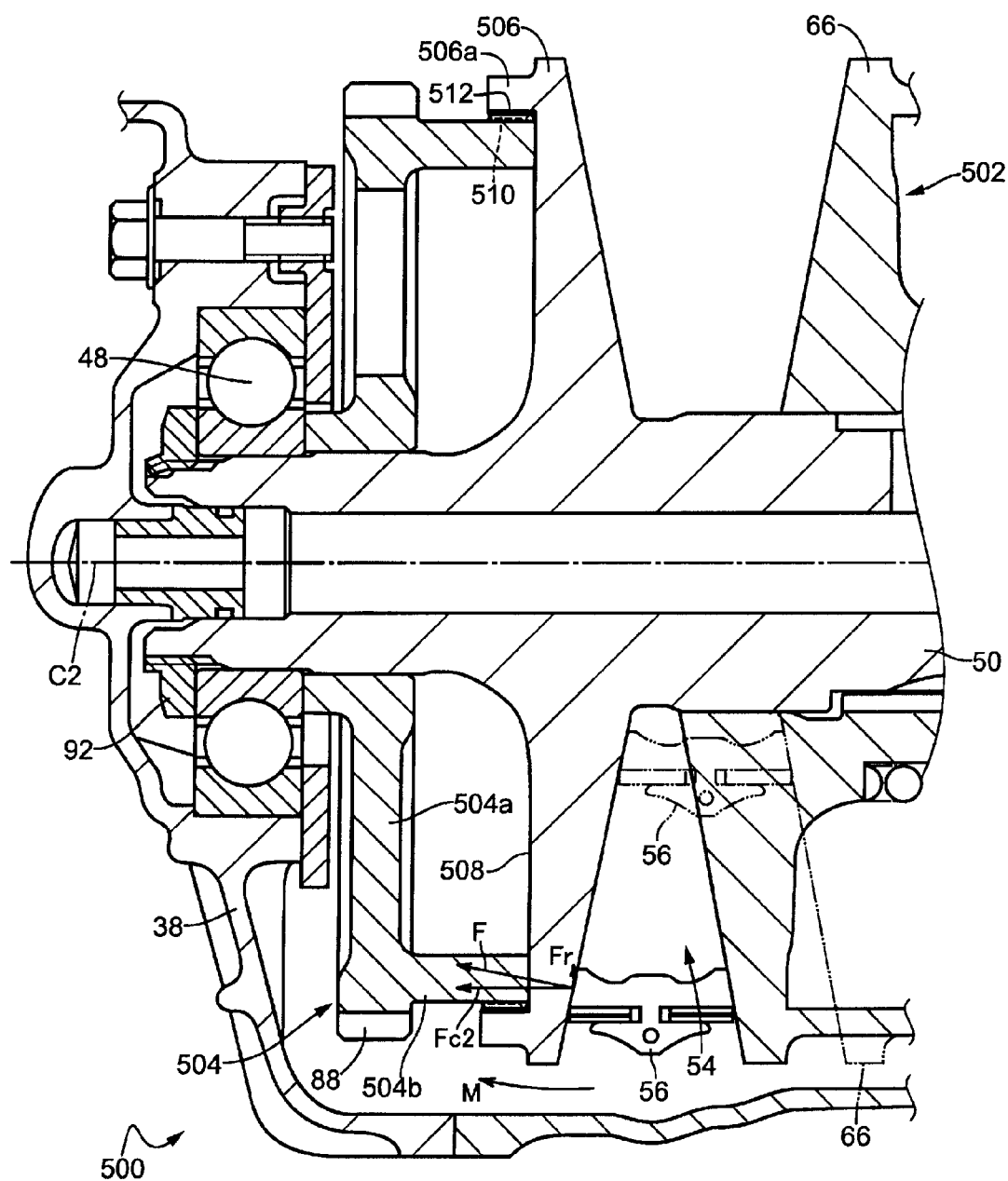
FIG. 7 is an enlarged cross-sectional view of a secondary pulley and a parking gear of a continuously variable transmission of another embodiment of the present invention.

FIG. 7 is an enlarged cross-sectional view of a secondary pulley 502 and a parking gear 504 of a continuously variable transmission 500 of another embodiment of the present invention. As depicted in FIG. 7, a fixed sheave 506 of the secondary pulley 502 includes an annular fitting portion 506a projected from an outer circumferential portion of a back surface 508 on the side opposite to the movable sheave 66 toward the fixed sheave 506, and the inner circumferential surface of the annular fitting portion 506a has a plurality of first spline teeth (engagement teeth) 510 each extending in the direction of the shaft center C2 and formed sequentially in a circumferential direction. Although the first spline teeth 510 of this embodiment are, for example, involute splines, other splines may be available. The parking gear 504 has an annular disc-shaped main body portion 504a having an inner circumferential surface fitted to the outer circumferential surface of the output shaft 50, and an annular projecting portion 504b projected from the main body portion 504a toward a back surface 508 of the fixed sheave 506 and abutting on the fixed sheave 506 at a radial position of the back surface 508 corresponding to the maximum winding diameter of the transmission belt 56. The parking gear 504 circumferentially engages with the fixed sheave 506 via a plurality of second spline teeth 512 each extended in the direction of the shaft center C2 in the outer circumferential surface of the leading portion of the annular projecting portion 504b and respectively engaging with a plurality of the first spline teeth 510.

In the continuously variable transmission 500 configured as above, the parking gear 504 functions as a member supporting the fixed sheave 506 to resist the shaft-center-direction reaction force Fc2 (bending moment M) as is the case with the first embodiment. Even if the moment causing the fall toward the side opposite to the movable sheave 66 is applied to the fixed sheave 506 due to the reaction force F applied from the transmission belt 56, the parking gear 504 radially supports the annular fitting portion 506a of the fixed sheave 206 with the annular projecting portion 204b of the parking gear 504 on the falling side. The parking gear 504 of this embodiment functions as a radially supporting member resisting a radial reaction force Fr that is a component in the direction orthogonal to the shaft center C2 of the reaction force F so as to prevent the fixed sheave 506 from falling.

In this embodiment, the torque of the output shaft 50 is transmitted to the parking gear 504 via the engagement portion between the first spline teeth 510 and the second spline teeth 512. The engagement portion between the first spline teeth 410 and the second spline teeth 412 is disposed on the outer circumferential side than the spline fitting portion between the outer circumferential surface of the output shaft 50 and the inner circumferential surface of the parking gear 104 formed in the conventional case depicted in FIG. 10, and when the parking pole engages with the outer circumferential teeth 88 of the parking gear 504 for non-rotatably fixing the output shaft 50, the strength equal to or more than the conventional case is ensured for resisting the reaction force applied from the parking pole to the parking gear 504.

The constituent elements other than those described above are the same as the first embodiment and, in the continuously variable transmission 500 of this embodiment, the fall of the fixed sheave 506 can be suppressed without adding a part with a relatively simple configuration as is the case with the first embodiment.

In the continuously variable transmission 500 of this embodiment, since the annular projecting portion 504b of the parking gear 504 is circumferentially engaged via the second spline teeth 512 with the first spline teeth (engagement teeth) 510 formed on the outer circumferential portion of the wall surface of the fixed sheave 506 on the side opposite to the movable sheave 66, i.e., the back surface 508, the conventionally disposed spline fitting portion between the parking gear 504 and the output shaft 50 can be eliminated. Since the engagement portion between the first spline teeth 410 and the second spline teeth 412 is disposed on the outer circumferential side than the spline fitting portion between the outer circumferential surface of the output shaft 50 and the inner circumferential surface of the parking gear 104 formed in the conventional case depicted in FIG. 10, when the parking pole engages with the outer circumferential teeth 88 of the parking gear 504 for non-rotatably fixing the output shaft 50, the strength equal to or more than the conventional case can be ensured for resisting the reaction force applied from the parking pole to the parking gear 504. Therefore, since the forming cost of the conventionally disposed spline fitting portion between the outer circumferential surface of the output shaft 50 and the inner circumferential surface of the parking gear 104 can be cut and the length of the output shaft 50 can be shortened by the reduction in length of the parking gear 504 in the direction of shaft center C2, the manufacturing cost of the continuously variable transmission 500 can be reduced.

Since the annular projecting portion 204b of the parking gear 504 radially supports the annular fitting portion 506a of the fixed sheave 206, the bending rigidity is enhanced in the output shaft 50 and the members fixed thereto as a whole. Therefore, the bending rigidity equal to or more than the conventional case can be ensured if the diameter of the output shaft 50 is reduced.

Sixth Embodiment

Figure 8:
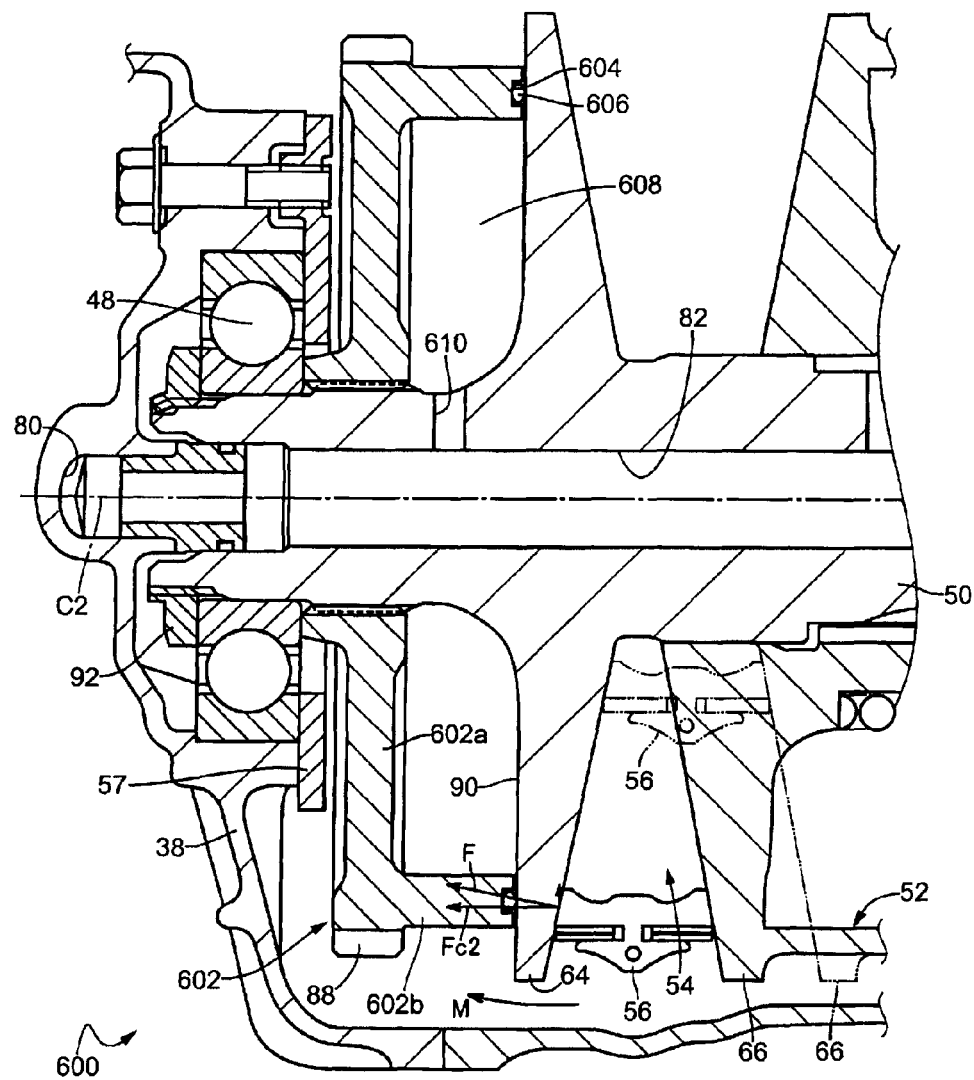
FIG. 8 is an enlarged cross-sectional view of the secondary pulley and a parking gear of a continuously variable transmission of another embodiment of the present invention.

FIG. 8 is an enlarged cross-sectional view of the secondary pulley 52 and a parking gear 602 of a continuously variable transmission 600 of another embodiment of the present invention. As depicted in FIG. 8, the parking gear 602 has a main body portion 602a same as the main body portion 86a of the parking gear 86 of the first embodiment, an annular projecting portion 602b projected from the outer circumferential portion of the main body portion 602a toward a radial position in the back surface 90 of the fixed sheave 64 corresponding to the maximum winding diameter of the transmission belt 56, and an O-ring 606 fitted into an annular O-ring groove 604 formed in a surface of the annular projecting portion 602b facing the back surface 90. The O-ring 606 is made of oil resistant synthetic rubber, for example, and is disposed in close contact with each of the bottom surface of the O-ring groove 604 and the back surface 90. The annular projecting portion 602b of the parking gear 602 abuts on the fixed sheave 64 via the O-ring 606. As a result, the inner circumferential side of the annular projecting portion 602b is provided with an oil pressure chamber 608 consisting of an annular space surrounded in an oil-tight manner by the main body portion 602a and the annular projecting portion 602b of the parking gear 602 and the fixed sheave 64. The oil pressure chamber 608 is supplied with a predetermined oil pressure from the second oil passage 82 through an oil pressure supply hole 610 radially penetrating the inner circumferential side of the oil pressure chamber 608 from the second oil passage 82 in the output shaft 55 to generate a pressing force pressing the wall surface of the fixed sheave 64 on the side opposite to the movable sheave 66, i.e., the back surface 90, toward the movable sheave 66. The oil pressure supplied to the oil pressure chamber 608 is a portion of the secondary oil pressure adjusted and controlled by the hydraulic control device and supplied to the hydraulic actuator 68 depicted in FIG. 2.

In the continuously variable transmission 600 configured as above, when the shaft-center-direction reaction force Fc2 in the direction of the shaft center C2 is applied from the transmission belt 56 to the fixed sheave 64 by clamping the transmission belt 56 between the fixed sheave 64 and the movable sheave 66, the fixed sheave 64 is affected by the moment M causing the fixed sheave 64 to fall toward the side opposite to the movable sheave 66 with the base portion, i.e., the inner circumferential portion of the fixed sheave 64 used as a fulcrum. In this case, the pressing force generated by supplying the secondary oil pressure to the oil pressure chamber 608 acts on the back surface 90 of the fixed sheave 64 in the opposite direction of the shaft-center-direction reaction force Fc2 to resist the shaft-center-direction reaction force Fc2 (bending moment M).

In the continuously variable transmission 600 of this embodiment, since the parking gear 602 is included that has a disc-shaped main body portion 602a fixed to the output shaft 50 on the side opposite to the movable sheave 66 relative to the fixed sheave 64, the annular projecting portion 602b projected from the outer circumferential portion of the main body portion 602a toward the radial position in the back surface 90 of the fixed sheave 64 corresponding to the maximum winding diameter of the transmission belt 56, and the O-ring 606 fitted into the annular O-ring groove 604 formed in the surface of the annular projecting portion 602b facing the back surface 90, and the oil pressure chamber 608 is included that is made of a space surrounded in an oil-tight manner by the main body portion 602a and the annular projecting portion 602b of the parking gear 602 and the fixed sheave 64 to generate a hydraulic force pressing the wall surface of the fixed sheave 64 on the side opposite to the movable sheave 66, i.e., the back surface 90, toward the movable sheave 66 when the secondary oil pressure adjusted and controlled by the hydraulic control device is supplied, even if the shaft-center-direction reaction force Fc2 in the direction of the shaft center C2 is applied from the transmission belt 56 to the fixed sheave 64 by clamping the transmission belt 56 between the fixed sheave 64 and the movable sheave 66, the pressing force is generated by the oil pressure chamber 608 formed with the parking gear 602 having only a relatively simple change from those conventionally used and the fixed sheave 64 and acts on the back surface 90 of the fixed sheave 64 to resist the shaft-center-direction reaction force Fc2 and, therefore, the fall of the fixed sheave 64 can be suppressed without adding a part with a relatively simple configuration.

Seventh Embodiment

Figure 9:
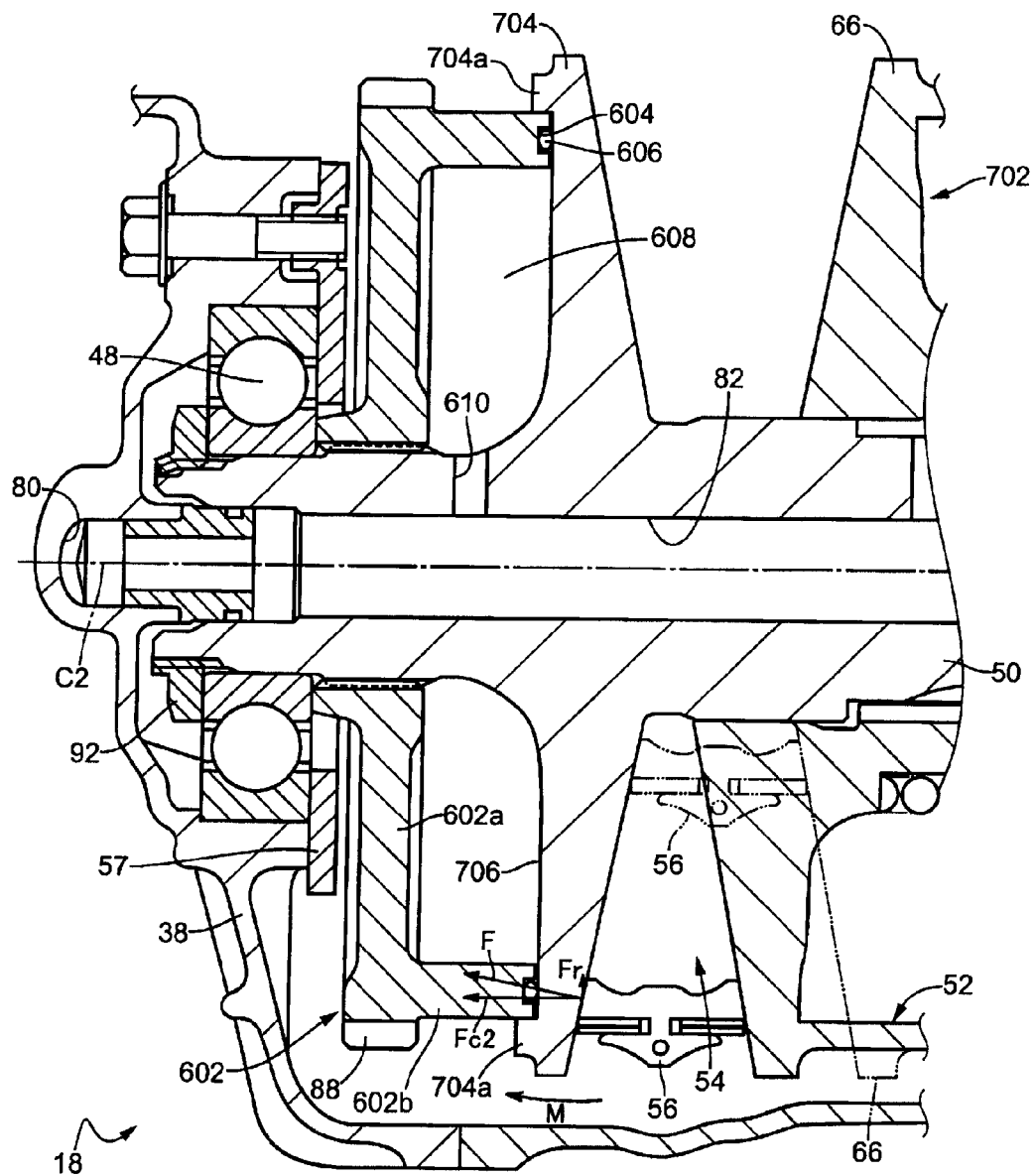
FIG. 9 is an enlarged cross-sectional view of a secondary pulley and a parking gear of a continuously variable transmission of another embodiment of the present invention.

FIG. 9 is an enlarged cross-sectional view of a secondary pulley 702 and a parking gear 602 of a continuously variable transmission 700 of another embodiment of the present invention. As depicted in FIG. 9, a fixed sheave 704 of the secondary pulley 702 includes an annular fitting portion 704a projected from an outer circumferential portion of a wall surface on the side opposite to the movable sheave 66, i.e., the back surface 706, toward the parking gear 602. The annular projecting portion 602b of the parking gear 602 is fitted into and radially engaged with the annular fitting portion 704a of the fixed sheave 704. The oil pressure chamber 608 is supplied with a predetermined oil pressure from the second oil passage 82 through the oil pressure supply hole 610 radially penetrating the inner circumferential side of the oil pressure chamber 608 from the second oil passage 82 in the output shaft 55 to generate a pressing force pressing the back surface 706 of the fixed sheave 64 toward the movable sheave 66. The oil pressure supplied to the oil pressure chamber 608 is a portion of the secondary oil pressure adjusted and controlled by the hydraulic control device and supplied to the hydraulic actuator 68 depicted in FIG. 2.

In the continuously variable transmission 700 configured as above, when the shaft-center-direction reaction force Fc2 in the direction of the shaft center C2 is applied from the transmission belt 56 to the fixed sheave 704 by clamping the transmission belt 56 between the fixed sheave 704 and the movable sheave 66, the fixed sheave 704 is affected by the moment M causing the fixed sheave 704 to fall toward the side opposite to the movable sheave 66 with the base portion, i.e., the inner circumferential portion of the fixed sheave 704 used as a fulcrum. In this case, the pressing force generated by supplying the secondary oil pressure to the oil pressure chamber 608 acts on the back surface 706 of the fixed sheave 704 in the opposite direction of the shaft-center-direction reaction force Fc2 to resist the shaft-center-direction reaction force Fc2 (bending moment M).

Even if the moment causing the fall toward the side opposite to the movable sheave 66 is applied to the fixed sheave 704 due to the reaction force F applied from the transmission belt 56, the parking gear 602 radially supports the inner circumferential surface of the annular fitting portion 704a of the fixed sheave 704 with the annular projecting portion 602b of the parking gear 602 on the falling side. The parking gear 602 of this embodiment functions as a radially supporting member resisting a radial reaction force Fr that is a component in the direction orthogonal to the shaft center C2 of the reaction force F so as to prevent the fixed sheave 704 from falling.

The continuously variable transmission 700 of this embodiment includes the oil pressure chamber 608 made of a space surrounded in an oil-tight manner by the main body portion 602a and the annular projecting portion 602b of the parking gear 604 and the fixed sheave 64 to generate a hydraulic force pressing the wall surface of the fixed sheave 704 on the side opposite to the movable sheave 66, i.e., the back surface 706, toward the movable sheave 66 when the secondary oil pressure adjusted and controlled by the hydraulic control device is supplied. As a result, even if the shaft-center-direction reaction force Fc2 in the direction of the shaft center C2 is applied from the transmission belt 56 to the fixed sheave 704 by clamping the transmission belt 56 between the fixed sheave 704 and the movable sheave 66, the pressing force is generated by the oil pressure chamber 608 formed with the parking gear 602 having only a relatively simple change from those conventionally used and the fixed sheave and acts on the back surface 706 of the fixed sheave 704 to resist the shaft-center-direction reaction force Fc2 and, therefore, the fall of the fixed sheave 704 can be suppressed without adding a part with a relatively simple configuration.

In the continuously variable transmission 700 of this embodiment, since the annular projecting portion 602b of the parking gear 602 is fitted into and radially engaged with the annular fitting portion 704a projected from the outer circumferential portion of the back surface 706 of the fixed sheave 704 toward the parking gear 602, even if the moment causing the fall toward the side opposite to the movable sheave 66 is applied to the fixed sheave 704 due to the reaction force F applied from the transmission belt 56, the annular projecting portion 602b of the parking gear 602 radially supports the inner circumferential surface of the annular fitting portion 704a of the fixed sheave 704 and, therefore, the fall of the fixed sheave 704 can be suppressed.

Although the exemplary embodiments of the present invention have been described in detail with reference to the drawings, the present invention is not limited to these embodiments and is also implemented in other forms.

For example, while the parking gear 86 (204, 304, 404, 504, and 602) is disposed on the output shaft 50, the parking gear may be disposed on the input shaft 34.

Although the pressing force from the parking gear 86 to the fixed sheave 64 is preliminarily applied to the fixed sheave 64 (206, 306, 406, 506, and 704) by clamping the parking gear 86 (204, 304, 404, 504, and 602) in the direction of the shaft center C2 between the nut 92 and the fixed sheave 64 (206, 306, 406, 506, and 704), this pressing force may not necessarily be applied. If applied, the pressing force may not be a larger value as much as possible within a range in which the fixed sheave 64 is not deformed toward the movable sheave 66.

Although, in the sixth and seventh embodiments, the parking gear 602 includes the O-ring 606 fitted into the O-ring groove 604 formed in the surface of the annular projecting portion 602b facing the back surface 90 and the oil pressure chamber 608 consists of an oil-tightly surrounded annular space formed in the inner circumferential side of the annular projecting portion 602b by disposing the O-ring 606 in close contact with each of the bottom surface of the O-ring groove 604 and the back surface 90, the oil pressure chamber 608 may be formed by disposing another seal member instead of the O-ring 606. The oil pressure chamber 608 may be formed by jointing the annular projecting portion 602b of the parking gear 602 and the back surface 90 of the fixed sheave 64 (704) by welding etc., continuously in a circumferential direction without a gap, for example.

Although, in the sixth and seventh embodiments, the parking gear 602 is abutted on the fixed sheave 64 (704) via the O-ring 606, the annular projecting portion 602b may be abutted on the fixed sheave 64 (704). A pressing force from the parking gear 602 to the fixed sheave 64 (704) may preliminarily be applied by clamping the parking gear 602 in the direction of the shaft center C2 between the nut 92 and the fixed sheave 64 (704).

The described embodiments are merely exemplary embodiments and, although not exemplarily illustrated one by one, the present invention may be implemented in variously modified and improved forms based on the knowledge of those skilled in the art without departing from the spirit thereof.

DESCRIPTION OF REFERENCE NUMERALS

18, 200, 300, 400, 500, 600, 700: belt type continuously variable transmission for a vehicle
34: input shaft
46: primary pulley (groove width variable pulley)
50: output shaft (one of the input shaft and the output shaft)
52, 202, 302, 402, 502, 702: secondary pulley (groove width variable pulley)
54: V-groove
56: transmission belt
64, 206, 306, 406, 506, 704: fixed sheave
66: movable sheave
86, 204, 304, 404, 504, 602: parking gear
86a, 204a, 304a, 404a, 504a, 602a: main body portion
86b, 204b, 304b, 404b, 504b, 602b: annular projecting portion
304c: stopper portion
90, 208, 308, 408, 508, 706: back surface (wall surface of the fixed sheave on the side opposite to the movable sheave)
92: nut
410, 510: first spline teeth (engagement teeth)
608: oil pressure chamber

The invention claimed is:

1. A belt type continuously variable transmission for a vehicle comprising: an input shaft and an output shaft disposed in parallel with each other; a pair of groove width variable pulleys disposed on outer circumferential sides of the input shaft and the output shaft; and a transmission belt wound around each of V-grooves of the pair of the groove width variable pulleys, the belt type continuously variable transmission for a vehicle changing a winding diameter of the transmission belt by changing groove widths of the V-grooves so as to continuously vary a gear ratio, wherein the groove width variable pulley includes a fixed sheave fixed to an outer circumferential surface of one shaft of the input shaft and the output shaft, and a movable sheave disposed relatively non-rotatably on the one shaft and relatively movably in a direction of a shaft center of the one shaft so as to form the V-groove with the fixed sheave, wherein the belt type continuously variable transmission for a vehicle is disposed with a parking gear having a disc-shaped main body portion fixed to the one shaft on a side opposite to the movable sheave relative to the fixed sheave, and an annular projecting portion projecting from the main body portion toward a wall surface of the fixed sheave on the side opposite to the movable sheave and abutting on the wall surface of the side opposite to the movable sheave on the outer circumferential side than a minimum winding diameter of the transmission belt, wherein the annular projecting portion of the parking gear abuts on the wall surface of the fixed sheave on the side opposite to the movable sheave at a radial position corresponding to the maximum winding diameter of the transmission belt, and wherein the parking gear includes a stopper portion projected from an inner circumferential side of the annular projecting portion of the main body portion toward the wall surface of the fixed sheave on the side opposite to the movable sheave, and wherein when a pressing force preliminarily applied to the fixed sheave from the annular projecting portion to the fixed sheave reaches a predetermined value defined in advance, the stopper portion abuts on the wall surface of the side opposite to the movable sheave to limit an application of the pressing force from the annular projecting portion to the fixed sheave.

2. The belt type continuously variable transmission for a vehicle of claim 1, wherein the annular projecting portion of the parking gear abuts on the wall surface, on the side opposite to the movable sheave, of the fixed sheave of the groove width variable pulley disposed on the output shaft.

3. The belt type continuously variable transmission for a vehicle of claim 1, wherein the annular projecting portion of the parking gear is fitted into and radially engaged with an annular fitting portion projected toward the parking gear from an outer circumferential portion of the wall surface of the fixed sheave on the side opposite to the movable sheave.

4. The belt type continuously variable transmission for a vehicle of claim 2, wherein the annular projecting portion of the parking gear is fitted into and radially engaged with an annular fitting portion projected toward the parking gear from an outer circumferential portion of the wall surface of the fixed sheave on the side opposite to the movable sheave.

5. The belt type continuously variable transmission for a vehicle of claim 1, wherein the annular projecting portion of the parking gear is circumferentially engaged with engagement teeth formed on an outer circumferential portion of the wall surface of the fixed sheave on the side opposite to the movable sheave.

6. The belt type continuously variable transmission for a vehicle of claim 2, wherein the annular projecting portion of the parking gear is circumferentially engaged with engagement teeth formed on an outer circumferential portion of the wall surface of the fixed sheave on the side opposite to the movable sheave.

7. The belt type continuously variable transmission for a vehicle of claim 3, wherein the annular projecting portion of the parking gear is circumferentially engaged with engagement teeth formed on the outer circumferential portion of the wall surface of the fixed sheave on the side opposite to the movable sheave.

8. The belt type continuously variable transmission for a vehicle of claim 4, wherein the annular projecting portion of the parking gear is circumferentially engaged with engagement teeth formed on the outer circumferential portion of the wall surface of the fixed sheave on the side opposite to the movable sheave.

9. The belt type continuously variable transmission for a vehicle of claim 1, wherein the parking gear is tightened by a nut screwed to a shaft end portion of the one shaft and is clamped in the direction of the shaft center with the fixed sheave.

10. The belt type continuously variable transmission for a vehicle of claim 1, comprising an oil pressure chamber made of a space surrounded in an oil-tight manner by the main body portion and the annular projecting portion of the parking gear and the fixed sheave to generate a hydraulic force pressing the wall surface of the fixed sheave on the side opposite to the movable sheave toward the movable sheave when a predetermined oil pressure is supplied.

* * * * *